_(12)_ United States Patent
Sinclair et al.

(10) Patent No.: US 8,852,682 B2
(45) Date of Patent: Oct. 7, 2014

(54) PROCESS FOR INCREMENTAL COATING OF PROPPANTS FOR HYDRAULIC FRACTURING AND PROPPANTS PRODUCED THEREFROM

(75) Inventors: A. Richard Sinclair, Houston, TX (US); Syed Akbar, Pearland, TX (US); Patrick R. Okell, Bellaire, TX (US)

(73) Assignee: Fairmount Minerals, Ltd., Chardon, OH (US)

( * ) Notice: Subject to any disclaimer, the term of this patent is extended or adjusted under 35 U.S.C. 154(b) by 2066 days.

(21) Appl. No.: 11/582,644

(22) Filed: Oct. 18, 2006

(65) Prior Publication Data

US 2007/0036977 A1    Feb. 15, 2007

Related U.S. Application Data

(62) Division of application No. 10/611,200, filed on Jul. 1, 2004, now Pat. No. 7,135,231.

(51) Int. Cl.
*C23C 16/00* (2006.01)
*C09K 8/80* (2006.01)

(52) U.S. Cl.
CPC .............. *C09K 8/805* (2013.01); *Y10S 977/963* (2013.01)
USPC ........... 427/212; 427/446; 427/447; 427/452; 427/453; 427/454; 427/214; 427/215; 427/222; 204/192.14; 204/192.15; 977/963

(58) Field of Classification Search
USPC ........ 427/446, 447, 452, 453, 454, 585, 593, 427/212, 214, 215, 222, 248.1; 204/192.14, 204/192.15
See application file for complete search history.

(56) References Cited

U.S. PATENT DOCUMENTS

| 3,492,147 | A | 1/1970 | Young et al. .................. 117/62.2 |
| 3,929,191 | A | 12/1975 | Graham et al. ................ 166/276 |
| 4,493,875 | A | 1/1985 | Beck et al. ..................... 428/403 |
| 4,604,319 | A | 8/1986 | Evans et al. .................... 428/290 |
| 4,717,594 | A | 1/1988 | Graham et al. ................ 427/214 |
| 4,732,920 | A | 3/1988 | Graham et al. ................ 523/145 |
| 4,920,192 | A | 4/1990 | Wiser-Halladay .............. 528/48 |
| 4,944,905 | A | 7/1990 | Gibb et al. ...................... 264/62 |
| 4,977,116 | A | 12/1990 | Rumpf et al. .................. 501/128 |
| 5,120,455 | A | 6/1992 | Lunghofer .................. 252/8.551 |

(Continued)

FOREIGN PATENT DOCUMENTS

EP    0 771 935 A1    5/1997    ............. E21B 43/04

OTHER PUBLICATIONS

Sinclair, A.R.; Graham, J.W.; Sinclair, C.P., "Improved Well Stimulation with Resin-Coated Proppants" *SPE Paper 11579*, presented at the 1983 SPE Production Operation Symposium, Oklahoma City, Feb. 27-Mar. 1, 1983.

(Continued)

*Primary Examiner* — Rodney McDonald
(74) *Attorney, Agent, or Firm* — Calfee, Halter & Griswold LLP

(57) ABSTRACT

A high strength composite particle comprised of a series of incrementally applied resin microlayer coatings such that each of the microlayer partial coatings are interleaved with each other is described. Methods of making the composite particles, as well as methods of using such particles as a proppant in oil and gas well hydraulic fracturing are also described.

14 Claims, 9 Drawing Sheets

(56) References Cited

U.S. PATENT DOCUMENTS

| | | | |
|---|---|---|---|
| 5,188,175 A | 2/1993 | Sweet | 166/280 |
| 5,218,038 A | 6/1993 | Johnson et al. | 524/541 |
| 5,422,183 A * | 6/1995 | Sinclair et al. | 428/403 |
| 5,501,275 A | 3/1996 | Card et al. | 166/280 |
| 5,531,274 A | 7/1996 | Bienvenu, Jr. | 166/280 |
| 5,597,784 A | 1/1997 | Sinclair et al. | 507/219 |
| 5,604,184 A | 2/1997 | Ellis et al. | 507/117 |
| 5,643,669 A | 7/1997 | Tsuei | 428/354 |
| 5,837,656 A | 11/1998 | Sinclair et al. | 507/220 |
| 5,916,933 A | 6/1999 | Johnson et al. | 523/208 |
| 5,921,317 A | 7/1999 | Dewprashad et al. | 166/208 |
| 6,059,034 A | 5/2000 | Rickards et al. | 166/280 |
| 6,116,342 A | 9/2000 | Clark et al. | 166/280 |
| 6,328,105 B1 | 12/2001 | Betzold | 166/280 |
| 6,372,678 B1 | 4/2002 | Youngman et al. | 501/128 |
| 6,406,789 B1 | 6/2002 | McDaniel et al. | 428/402 |
| 6,582,819 B2 | 6/2003 | McDaniel et al. | 428/402 |
| 6,660,395 B2 | 12/2003 | McGarry et al. | 428/447 |
| 6,749,025 B1 | 6/2004 | Brannon et al. | 166/305.1 |
| 2002/0048676 A1 | 4/2002 | McDaniel et al. | 428/404 |
| 2002/0058581 A1 | 5/2002 | Youngman et al. | 501/155 |
| 2003/0186820 A1 | 10/2003 | Thesing | 507/200 |
| 2005/0019574 A1 * | 1/2005 | McCrary | 428/403 |
| 2005/0196584 A1 | 9/2005 | Halecki et al. | 428/100 |

OTHER PUBLICATIONS

Norman, L.R.; Terracina, J.M.; McCabe, M.A.; Nguyen, P.D., "Application of Curable Resin-Coated Proppants", *SPE Production Engineering* 1992, pp. 343-350.

Almond, S.W.; Penny, G.S.; Conway, M.W., "Factors Affecting Proppant Flowback with Resin Coated Proppants", *SPE Paper 30096,* presented at the European Formation Damage Conference held in The Hague, The Netherlands, May 15-16, 1995.

Nguyen, P.D., et al., "Enhancing Fracture Conductivity Through Surface Modification of Proppant", *SPE Paper 39428,* presented at the Formation Damage Control Conference held in Lafayette, LA, Feb. 18-19, 1998.

* cited by examiner

PROCESS FOR INCREMENTAL COATING OF PROPPANTS FOR HYDRAULIC FRACTURING AND PROPPANTS PRODUCED THEREFROM

This application is a divisional application of U.S. patent application Ser. No. 10/611,200, filed Jul. 1, 2004 now U.S. Pat. No. 7,135,231, which is incorporated by reference herein in its entirety.

FIELD OF THE INVENTION

The present invention relates to coated particles typically used as proppants in fracturing subterranean formations around oil and gas wells and, more specifically, to a method for coating resin particles for such application. In particular, a method for coating resin particles in an incremental manner wherein the final product has multiple partial coats interleafed together into microlayers is described. The invention also relates to methods for using these coated particles as proppants in hydraulic fracturing and gravel pack completions, and numerous other hydrocarbon-related applications.

BACKGROUND OF THE INVENTION

In oil and gas wells, it often becomes necessary to stimulate hydrocarbon flow in order to attain economical feasible production rates, or to increase production rates. The technique frequently used to stimulate wells in such a manner is termed "fracturing", and refers to a method of pumping a fluid into the well until the pressure increases to a level sufficient to fracture the subterranean geological formation, resulting in cracks in the formation. These cracks are capable of carrying product to the well bore at a significantly higher flow rate.

In general, proppants are extremely useful to keep open fractures imposed by hydraulic fracturing of a subterranean formation, e.g., an oil or gas bearing strata. Typically, the fracturing is desired in the subterranean formation to increase oil or gas production. As noted above, fracturing is caused by injecting a viscous fracturing fluid, foam, or other suitable fluid at high pressure into the well to form fractures. As the fracture is formed, a particulate material, referred to as a "propping agent" or "proppant" is placed in the formation to maintain the fracture in a propped condition when the injection pressure is released. As the fracture forms, the proppants are carried into the well by suspending them in additional fluid or foam to fill the fracture with a slurry of proppant in the fluid or foam. Upon release of the pressure, the proppants form a "pack" which serves to hold open the fractures. The goal of using proppants is to increase production of oil and/or gas by providing a highly conductive channel in the formation. Choosing the correct proppant, therefore, is critical to the success of well stimulation.

The propped fracture thus provides a highly conductive channel in the formation. The degree of stimulation afforded by the hydraulic fracture treatment is largely dependent upon formation parameters, the fracture's permeability and the fracture's propped width. If the proppant is an uncoated substrate, e.g., sand, and is subjected to high stresses existing in a gas/oil well, the substrate may be crushed to produce 'fines' (particles with a sub-100 mesh (~120 micron) size) of crushed proppant. Fines will subsequently reduce conductivity within the proppant pack. However, a resin coating will enhance crush resistance of a coated particle above that of the substrate alone and prevent crushed fine particles from migrating back to the wellbore area or plugging the remaining proppant pack.

Glass beads had been used as propping materials (see U.S. Pat. No. 4,068,718, for example). Their disadvantages include the high costs of energy and production, as before, and their severe drop in permeability at elevated pressures (above about 35 MPa) because of their excessive crushing at downhole conditions. Thus, the use of glass beads alone is not currently favored in the field. Rather, three different types of propping materials, i.e., proppants, are currently employed.

The first type of proppant is a sintered ceramic granulation/particle, usually aluminum oxide, silica, or bauxite, often with clay-like binders or with incorporated hard substances such as silicon carbide (e.g., U.S. Pat. No. 4,977,116 to Rumpf et al, incorporated herein by reference, EP 0 087 852, EP 0 102 761, or EP 0 207 668). The ceramic particles have the disadvantage than the sintering must be done at high temperatures, resulting in high-energy costs. In addition, expensive raw materials are used. They have relatively high bulk density, and often have properties similar to those of corundum grinding materials, which causes high wear in the pumps and lines used to introduce them into the drill hole. Also, during production after the hydraulic frac job, the abrasive particles that flow back may cause severe wear on valves and chokes at the wellhead.

The second type of proppant is made up of a large group of known propping materials from natural, relatively coarse, sands, the particles of which are roughly spherical such that they can allow significant flow. Exemplary proppants of this type are described in U.S. Pat. No. 5,188,175.

The third type of proppant, and that which is related to the coated resins of the present invention, includes proppants of type one and two above that are coated with a layer of synthetic resin such as described in U.S. Pat. No. 5,420,174 to Deprawshad et al; U.S. Pat. No. 5,218,038 to Johnson et al; and U.S. Pat. No. 5,639,806 to Johnson et al.

Known resins used in resin coated proppants include epoxy, furan, phenolic resins, resole-modified Novolac resins, and combinations of these resins. The resins are typically from about 1 to about 8 percent by weight of the total coated particle. The particulate substrates for resin coated proppants are typically described to be sand, ceramics or other particulate substrate and typically have a particle size in the range of USA Standard Testing screen numbers from about 8 to about 100 (i.e. screen openings of about 0.0937 inch to about 0.0059 inch).

Resin coated proppants can be further classified into precured and curable resin coated proppants. Precured resin coated proppants comprise a substrate coated with a resin which has been significantly crosslinked. The resin coating of the precured proppants provides crush resistance to the substrate. Since the resin coating is already cured before it is introduced into the well, even under high pressure and temperature conditions, the proppant does not agglomerate. Such precured resin coated proppants are typically held in the well by the stress surrounding them. In some hydraulic fracturing circumstances, the precured proppants in the well would flow back from the fracture, especially during clean up or production in oil and gas wells. Some of the proppant can be transported out of the fractured zones and into the well bore by fluids produced from the well. This transportation is known as flow back.

Flow back of proppant from the fracture is undesirable and has been controlled to a large extent by the use of a proppant coated with a curable resin which will consolidate and cure underground. Phenolic resin coated proppants have been commercially available for some time and used for this purpose. Thus, resin-coated curable proppants may be employed to "cap" the fractures to prevent such flow back. The resin coating of the curable proppants is only-partially crosslinked or cured before injection into the oil or gas well. The coating is designed to crosslink under the stress and temperature conditions existing in the well formation. This causes the proppant particles to bond together forming a 3-dimensional matrix and preventing proppant flow back.

Over the years, numerous improvements have been made to proppants in order increase their strength and stability while at the same time maintaining permeability at the required subterranean depths and pressures.

U.S. Pat. No. 3,492,147 to Young, et al., describes a method of coating particulate solids with an infusible resin. The particulates to be coated include sand, nut shells, glass beads, and aluminum pellets. The resins used include urea-aldehyde resins, phenol-aldehyde resins, epoxy resins, furfuryl alcohol resins, and polyester or alkyl resins.

Graham et al., in U.S. Pat. No. 3,929,191 describe particles coated with solid, fusible resin for use in treating subterranean formations. As described therein, particles such as glass beads are coated with a thermosetting resin such as one-step phenolics that, at formation conditions, first melts or softens, and then cure to form an insoluble, infusible cross-linked particle, allowing the particles to bond together and form a self-sustaining structure in the formation with a high compressive strength.

U.S. Pat. No. 5,643,669 to Tsuei has suggested a low volatile organic compound curable water-based particle coating composition, wherein the composition includes a urethane/acrylic copolymer having a glass transition temperature, $T_g$, of greater than 50° C. The coating composition further includes a polyoxyethylene aryl ether plasticizer, an alkaline-stable cross-linker, and water, and does not include undesirable amount of volatile organic coalescing agents.

In U.S. Pat. No. 5,916,933 issued to Johnson, et al., proppants comprising a particle coated with a composition containing bisphenol-aldehyde novolak resin, a bisphenol homopolymer, or mixtures of such polymers are suggested. Also offered are methods of making and using such proppant particles in subterranean formations, or in foundries. The resin composition also includes the incorporation of certain crosslinking agents, such as hexamethylenetetramine. The bisphenol-homopolymer-coated particles are further described as having a crush-strength comparable to that of conventional phenol-formaldehyde novolak polymer coated particulate material, but with an advantage of eliminated release of free phenol to the environment.

U.S. Pat. No. 6,059,034 to Rickards, et al. (issued May 9, 2000), describes a blend of fracture proppant material and deformable particulate material for fracturing processes. The deformable particulate material, such as polystyrene divinyl-benzene beads, combines with the fracture proppant material, such as sand, to reportedly increase the fracture conductivity while simultaneously reducing fines generation and proppant flowback.

In U.S. Pat. No. 6,328,105, Betzold suggests a coated proppant and method of using such particles in increasing the conductivity and productivity of subterranean fractures. As described therein, the proposed proppant comprises a mixture of bondable particles and removable particles. The bondable particles, when in place in a subterranean formation, allegedly adhere to one another to form a self-supporting matrix that is interspersed with removable particles.

Finally, a composite proppant made of resin and a filler material for use in the fracturing of subterranean formations, as well as making the composite particles, is offered by McDaniel et al. in U.S. Pat. No. 6,406,789 (issued Jun. 18, 2002). The composite particles are described as being proppants made from fillers such as finely divided particles.

This multitude of approaches to resin-coated proppants, while varying in the nature of their components and processes for manufacture, all maintain a common feature—that is, they rely upon the formation of consecutive "layers" of resin coatings over the entire surface of the particular proppant. This approach is generally illustrated in FIG. 1, wherein the inner particle 2 has a generally spherical outer coating 4. Such a coating may be expanded to include other coatings, in which case there would be inner and outer coatings. Note that the coating thickness as shown in the illustration has been exaggerated for the purpose of clarification.

While a variety of useful proppants are known, there still remains the need for proppants having improved features such as high compressive strength, long term conductivity, i.e. permeability at the high closure stresses present in the subterranean formation, reduced fines production, bondability between proppant particles in the downhole environment, and improved flowback characteristics.

SUMMARY OF THE INVENTION

The present invention provides an improved resin or polymer-coated particle comprising a particulate substrate, and a number of polymer and/or resin polymer partial microlayer coatings which are interleaved with each other. The interleaved microlayer coatings can include nanoparticulate reinforcing agents, curing agents, and encapsulating agents.

The invention provides a process for making a coated particle, typically for use as a proppant, comprising the steps of heating a particle to a temperature between about 200° F. and 800° F., adding the heated particle to a mixing apparatus, applying a coupling agent onto the surface of the particle, sputtering a resin coat onto at least a portion of the surface of the particle, and sputtering a number n of additional resin coats onto the particle in an incremental manner, such that the resultant coated particle has a plurality of interleaved resin coats fully coating the particle.

The invention further provides a high strength, incrementally coated particle comprising a particulate substrate, and a number n of incremental resin coats covering the substrate by interleafing layers.

Further provided by the present invention is a high strength, incrementally coated particle comprising a particulate substrate, a number n of incremental resin coats covering the substrate by interleafing layers, and further comprising a reinforcing agent interleafed within the incremental resin coats.

The invention also provides an improved method for fracturing a subterranean formation having a wellbore comprising placing into the wellbore a quantity of free-flowing, incrementally coated and reinforced particles mixed with a fluid, injecting the fluid containing the resin-coated proppant into the wellbore, and filtering out the resin-coated proppant from the fluid so as to produce a packed mass of particles that are adjacent to the fracture, such that the packed mass of particles will prop open the fracture and allow produced fluids to flow towards the wellbore.

The present invention further provides a method of tracing particles pumped into a subterranean formation comprising the steps of incrementally coating a particle with at least one nanoparticulate element that is capable of being converted to a radioactive elemental isotope, wherein the nanoparticulate element is interleaved with other coatings on the particle; converting the nanoparticulate element to a radioactive elemental isotope; adding the incrementally coated particles containing the radioactive nanoparticulate element to a fluid prior to injecting the fluid into a subterranean formation; injecting the fluid into the subterranean formation; and logging the well with an instrument capable of detecting the radioactive nanoparticulate element in order to determine fluid and particle location within the subterranean formation.

The invention further describes a method of propping a fracture in a subterranean formation comprising the steps of creating at least one fracture in the subterranean formation, and placing into the fractures a quantity of high strength, free flowing particles comprising a particulate substrate and an interleafed resin coating covering the particulate substrate, wherein the interleafed resin coating is generated in an incremental manner.

The present invention also provides an improved method for producing a free-flowing, incrementally coated particle having resin and/or polymer coatings interleafed with each other. These coated particles are produced by adding multiple partial microlayers with one or more resins, particles, etc., including nanoparticles, for the purpose of reinforcing the core particle. This intermittent process produces greater strength of attachment for all coatings and can reinforce the properties of each coating in a synergistic manner.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

DEFINITIONS

Figure 1:
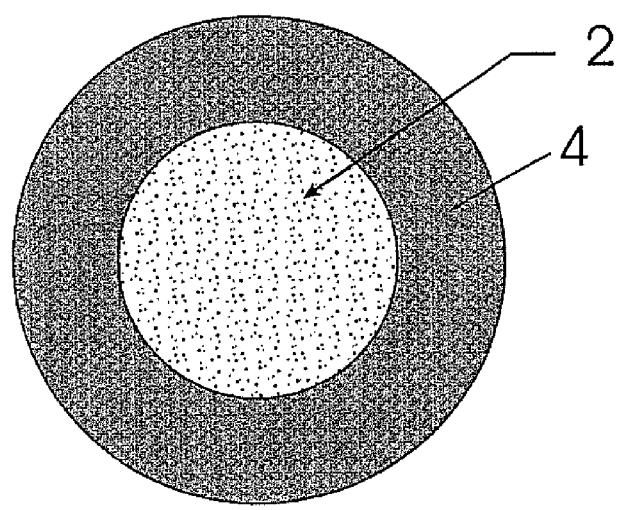
FIG. 1. is a schematic representation of a resin-coated particle of the prior art, including a non-deformable core with its entire surface surrounded by at least one coating or layer.

The following definitions are provided in order to aid those skilled in the art in understanding the detailed description of the present invention.

"Nanoparticle", as used herein, refers to particles generally having at least one dimension (d) of ≤400 nm, wherein the chemical and/or physical properties are a function of the size and shape of the particle.

"Sputtering", as used herein, refers to a physical deposition method that does not involve solution based chemistry and generally involves a fabrication of thin microcoatings along at least a portion of a surface of a substrate, wherein the chemicals, powders, and other additititives to be deposited are generally used as a feedstock and fed into a air or gas-powered nozzle which is aimed at the surface of substrates. The powders, chemicals, etc. are propelled in the gas flow to form coatings, partial coatings, or interleafed coatings on the substrate. The sputtering includes methods in the ambient atmosphere or vacuum, high velocity oxyfuel spraying, or high velocity impact fusion spraying. Consequently, sputtering includes but is not limited to vapor deposition, particle deposition, beam-induced evaporation/deposition, and thermal spraying.

"Interleafing", or "interleaf", as used herein, refers to the arrangement of the coatings on a particle, such that the coatings are arranged in alternate layers to form a series of overlapping partial coats, but singly do not form a single entire encapsulation coating.

"Curably Reinforced Incremental partial Microlayer Particle," or "CRIMP" as used herein, refers to those particles made by the process of the current disclosure having a series of interleafed microlayers and a final, curable coating as the final coat.

"Precured Reinforced Incremental partial Microlayer Particle," or "PRIMP" as used herein, refers to those particles made by the process of the current disclosure having a nanoparticulate reinforcing agent included in the interleafed microlayers.

"Encapsulated Reinforced Incremental partial Microlayer Particle," or "ERIMP" as used herein, refers to those particles made by the process of the current disclosure having a resinous encapsulation layer crosslinked with a curing agent as the final coating.

DETAILED DESCRIPTION OF THE INVENTION

In a preferred embodiment of the present invention the proppant, which is generally sand, lightweight ceramic, or bauxite, is incrementally coated with several different partial microlayers, wherein each layer of coating is added in order to perform a specific function and provides a specific benefit to the resultant proppant.

The first step in the methods of the instant invention is obtaining a suitable particulate material. For the purposes of the present disclosure, the term proppant will be used to refer to any particulate solid material which is stable at the conditions that will be encountered in the producing formations over a long period of time. Specifically, it is preferred that the granular material be hard, rigid, generally spheroidal particles of material which are substantially inert to crude oil, natural gas, water, brine and other fluids naturally present in subterranean formations and producing wells, as well as to fluids commonly injected into subterranean petroleum formations for the purpose of stimulating oil production.

Particulate substrates, or proppants, also termed "particles" herein, suitable for use with the present invention can be selected from any propping agent suitable for hydraulic fracturing known in the art. Examples include, but are not limited to, natural materials, silica proppants, ceramic proppants, metallic proppants, synthetic organic proppants, sintered bauxite, and combinations thereof.

Natural products suitable for use as particulates in the present disclosure include, but are not limited to, nut shells such as walnut shells, brazil nut shells, and macadamia nut shells, as well as fruit pits such as peach pits, apricot pits, olive pits, and any resin impregnated or resin coated version of these.

Silica particles suitable for use with the present invention include, but are not limited to, glass spheres and glass microspheres, glass beads, silica quartz sand, silicon carbide, and sands of all types such as white or brown. Typical silica sands suitable for use include Ottawa, Jordan, Brady, Hickory, Arizona, and Chelford, as well as any resin coated version of these sands.

Other suitable proppants include a variety of naturally occurring minerals and their oxides. Such compounds include alumina, cordierite, gilsonite, mullite, calcium oxide, and zirconium oxide.

Ceramic proppants suitable for use with the methods of the present invention include, but are not limited to, ceramic beads, ceramic oxides, ultra lightweight porous ceramics, economy lightweight ceramics such as "EconoProp®" or "ValuProp®" (Carbo Ceramics, Inc.), lightweight ceramics such as "CarboLite®" or "Naplite®" (Carbo Ceramics, Inc.), intermediate strength ceramics such as "CarboProp®" (Carbo Ceramics Inc.) or "Interprop®" (Norton Proppants), and high strength ceramics such as "CarboHSP®" (Carbo Ceramics, Inc.), "Sintered Bauxite™" (Norton Proppants), "SinterLite", "Sinterball™" (Sintex Minerals & Services, Inc.), or "Versaprop" (Norton Proppants) as well as any resin coated or resin impregnated versions of these.

Metallic particles suitable for use with the embodiments of the present invention include, but are not limited to, aluminum shot, aluminum pellets, iron shot, steel shot, and the like, as well as any resin coated versions of these metallic proppants.

Synthetic particles are also suitable for use with the present invention. Examples of suitable synthetic particles include, but are not limited to, plastic particles or beads, nylon beads, nylon pellets, SDVB beads, and resin agglomerate particles similar to "FlexSand MS", as well as resin coated versions thereof.

Additionally, soluble materials suitable for use as proppants are also envisioned to be useful with the methods of the present invention. For example, soluble proppants, which are placed in the channels of the created perforations, include but are not limited to marble or limestone chips or any other suitable carbonate particulates. Additionally, wax, plastic, or resin particles, either coated or uncoated, which are either soluble through contact with a treatment chemical or can melt and flowback from the fracture are suitable for use as proppants with the present invention.

As a practical matter, naturally occurring particulate materials such as small pebbles, gravel or sand are often used. The particle size distribution is not critical and any size proppant can be used. The preferred proppant has a predominant portion of its particle size in the range of minus 20 mesh to plus 40 mesh, or minus 16 mesh to plus 30 mesh, with the actual distribution further restricted based on the well to be treated. Suitable mesh sizes for use with the present invention include 8/12, 8/14, 8/16, 12/18, 12/20, 16/20, 16/30, 20/40, 30/50, and 40/70. Generally, the 20/40 mesh proppant comprises the majority of the product used. However, both larger and smaller grain proppants are required for different types and depths of wells.

Generally no special pretreatment of the proppant will be required prior to subjecting it to the various treatments to be described below, although if the proppant is seriously contaminated with oil or other materials, it should be washed by some suitable means to remove the oily materials from the surface which might interfere with the proper coating of the various fluids.

The present invention can be carried out with any suitable substrate. Choice of the particular substrate is governed by the properties required by the specific application. An advantage of the present invention is that numerous conventional particulates, such as "frac sand" can be rendered superior to the more expensive, specially modified proppants without a significant increase in cost.

Figure 2:
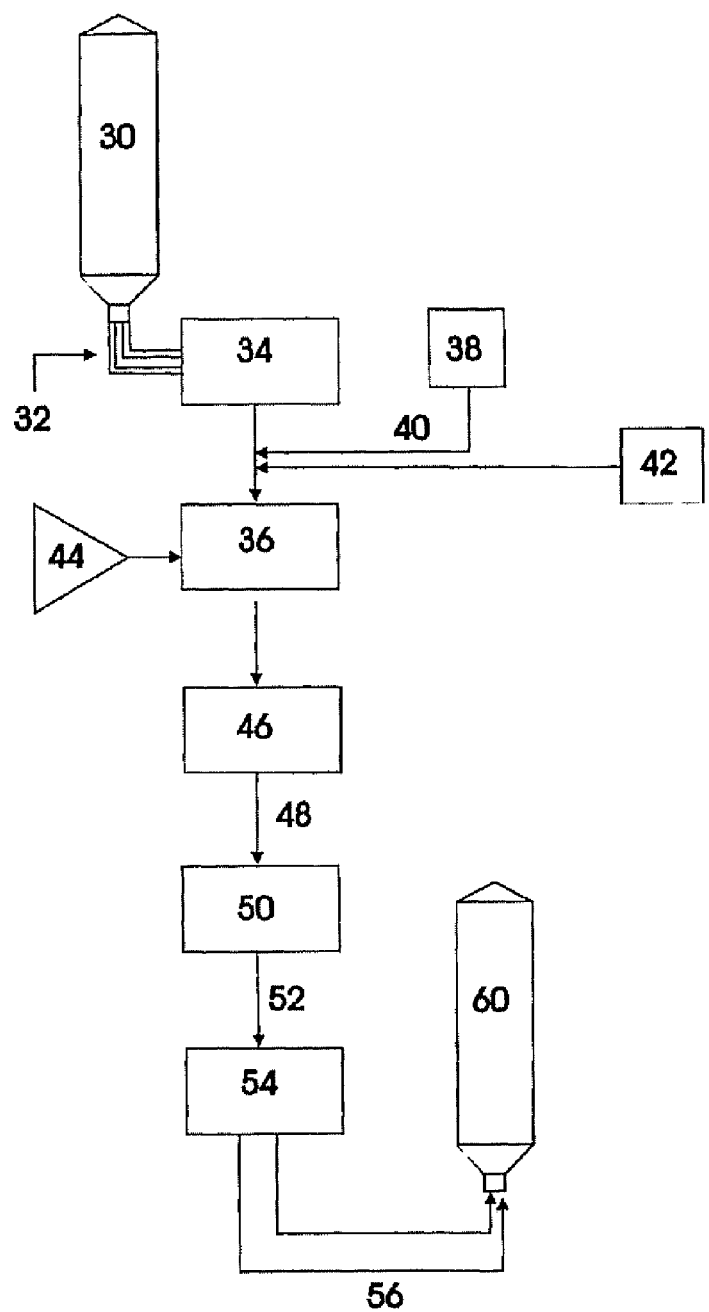
FIG. 2 is a process flowchart of a method of making incrementally, interleafed microlayer coated proppants in accordance with the present disclosure.

A preferred general process for the incremental coating of proppants with reinforced incremental partial microlayers (RPMs) for use in hydraulic fracturing and other associated applications is shown in FIG. 2, illustrating a simplified process flow diagram in accordance with the present disclosure.

In a typical process, a substrate such as sand or bauxite is charged from a silo, hopper, storage bin, or other form of bulk storage 30 via a conveyor (screw, belt, bucket, continuous flow, etc.) or feeder 32 to a heater/heat exchanger 34. The amount of substrate discharged depends upon batch size and is weighed out using any number of known substrate scales/weighing devices (not shown), such as conveyor scales, crane scales, floor scales, track scales, or any other suitable load cell. The measured weight is then heated to a temperature between about 200° F. (93.3° C.) and 800° F. (426.7° C.), preferably between about 300° F. (148.8° C.) and 550° F. (288° C.), and more preferably between about 350° F. (176.6° C.) and 450° F. (232.2° C.) in heat exchanger 34, such as but not limited to a rotary or drum heater of either the single-drum or double-drum type, or a rotating-shelf type heater such as the Roto-shelf (Buflovak Buffalo, N.Y.).

Upon reaching the required temperature, the heated substrate is charged into a high-speed mixer 36, such as a paddle mixer, plough (or 'plow') mixer, plough-blade mixer, 'Z'-blade mixer (tilting, bottom outlet, and the like), or a trough mixer. Preferably, the mixer is a plough-type mixer. The mixing speed of the mixer is set such that the entire charge is in constant motion and rotation. At this point, a coupling agent 38 of the organofuctionalized silane type, alkoxyzirconate type, or alkoxytitanate type can be added as the substrate flows into the mixer via a separate flow stream 40.

Powdered or liquid form resin 42 (e.g., resin suspended in a carrier medium), in an amount from about 0.5% to about 5.0% by weight of the substrate, is then added in cycles to mixer 36 by means of at least one injection nozzle or pressurized injection nozzle 44. Single nozzles, several nozzles in series, or several nozzles specifically placed with respect to the mixer 36 can be used. In accordance with the present disclosure, nozzle/sprayer systems 44 suitable for use include but are not limited to air-assisted nozzle/injection systems, electrostatic spray nozzle systems such as the ESS Maxcharge™ Spray System (ESS Inc., Watkinsville, Ga.), and other known, pressurized injector systems. The injection nozzles 44 direct the resin plume or spray at the exact point of maximum mixing intensity within the mixer 36 in pulsating bursts of about 0.5 seconds to about 5 seconds, depending upon desired microlayer thickness. The preferred addition is in 1.0 second bursts in order to add a partial microlayer to one, or part of one side of substrate surface as in passes the injector. This first burst is followed by a second pulsed burst of curing agent addition in the form of a fine spray in a burst length of about 0.5 seconds to about 1.5 seconds. Such curing agent can be selected from a series of suitable resoles or more commonly, and most preferred, hexamethylenetetramine (HMTA). Typically, the curing agent is added at about 1% to about 25%, and more preferably at about 10% to about 20% of the total weight of the resin. In some instances, there may be overlapping of the above cycles in order to effect degree of curability.

Powdered or fibrous reinforcing agents can similarly be added in bursts of 0.5 seconds during, after, or simultaneously with the curing agent addition. Reinforcing agents can form in total about 1% to about 25% by weight of the total resin addition, depending on the crush resistance needed in the final product.

Owing to the fact that melting of the resinous powder (or coating on the substrate, in the case of liquid resin) is almost instantaneous, successive incremental partial microlayers of resin can be added in the fashion described above in a rapid manner, with up to n sequenced interleaved microlayers of resin, curing agent, and reinforcing agents combined in total to form a series of interleaved microlayers. The number of sequenced, interleaved microlayers, n, can be any number from 1 to 1000, and is preferably between 1 and 100. More preferably, the number of sequenced, interleaved microlayers n is between 1 and 60. A completely cured coating can thus be obtained at this stage of the process after a short period of time (e.g., about 90 to about 180 seconds of mixing time), producing a Precured Reinforced Incremental Partial Microlayer particle, or 'PRIMP'.

While not wishing to be held to any one theory, the above-described method of deposition using the technique of sputter deposition is believed to occur when the depositing atoms, nanoparticles, or particles collide with the surface (or more accurately a portion of the surface due to the speed of rotation of the substrate in the mixer 36) of the substrate with high energies, resulting in smooth, partial coatings which become interleaved over the progress of the deposition. It is further believed that during such a deposition process as described herein, a microlayer or film grows by the formation of "islands" of particles that are only a few atoms thick, and increased atom energies (e.g., those energies that result from a combination of the substrate mixing at a high rpm and the particles being injected at a similar high velocity) result in smoother films interleaved together due to the formation of more, but smaller "islands".

If a curable outer coating is desired in order to form a Curable Reinforced Partial Microlayer Particle ('CRIMP'), an addition of water, air, or high pressure gas may alternatively be added as the last coating step to drop the temperature prior to applying a sustained burst of resin addition for 3 to 5 seconds, followed by a 5 second burst of curing agent. This is immediately followed by a second stage of water to quench the reaction and prevent complete cure of this final stage of resin addition. The amount of water needed is approximately 5 gallons per 1000 pounds of substrate (5 gal/1000 lbs), wherein about 50% of the water is preferably added prior to the final coating, and about 50% of the water is added after the final coating.

Following discharge from the mixer 36, the interleafed, microlayer coated substrate mass is passed to a continuous mixer 46 where any lumps or aggregations which might have formed are removed. The continuous mixer 46 can be a free-rotor continuous mixer, a Farrell continuous mixer, a single- or twin-screw mixer, a trough-and-screw mixer, a Rietz extruder, a continuous-screw mixer such as the Holo-Flite Processor, a motionless (static) mixer such as the Kenics static mixer (Chemineer, Inc., Dayton, Ohio), or any other suitable continuous mixer known in the art.

From the continuous mixer, the interleafed, microlayer coated material stream 48 passes to a cooling apparatus 50. Typically, cooling apparatus 50 is a rotating shell heat-transfer device operating at such a level so as to produce a cured, microlayer coated product wherein each of the various microlayers, n, is interleaved within each other. Cooled product stream 52 then feeds and passes through a filtering screen or other screening surface or apparatus 54, such as those described in *Perry's Chemical Engineers' Handbook* ($7^{th}$ Ed, McGraw Hill, 1997; pp. 19.18-19.23) in order to recover a granulated proppant product stream 56 of predetermined product size. A typical desired proppant particle has a $d_{50}$ from 0.4 to 0.8 mm, or a particle diameter range from about 20 to 40 mesh (0.425 to 0.85 mm). However, in accordance with the present disclosure, the proppant particle can have a mesh size from about 8 to about 40. Following the filtering to the desired mesh size, granulated product stream 56 then passes to a storage facility 60.

Electrostatic sprayers, such as described above for use in the process of the present disclosure, impart energy to the coating composition via a high electrical potential. This energy serves to atomize and charge the coating composition, creating a spray of fine, charged particles. As the charged particles are carried away from the sprayer, their common charge causes them to repel one another. This has two effects before the spray hits the target substrate—expansion of the spray mist, and maintenance of particle size. The first of these effects, expansion of the spray mist, is important in the instances when spraying is done to fairly distant and/or large areas, such as in the present invention. The maintenance of particle size is the other important effect. Due to the fact that particles repel one another, they resist collecting together into large, heavier particles like uncharged particles do. This lessens gravity's influence, and increases the charged particle's chance of reaching the target. As the mass of negatively charged particles approach the target, they push electrons inside the target inwardly, leaving all the exposed surfaces of the target with a temporary positive charge. The resulting attraction between the particles and the target overrides the influences of gravity and inertia. As each particles deposits on the target, that spot on the target becomes "neutralized" and no longer attractive. Therefore, the next free particle is attracted to some spot elsewhere on the target. The sequence continues, until the desired coating of the surface of the proppant is achieved. Hence, charged particles improve distribution and reduce drippage.

Non-limiting examples of commercially available electrostatic sprayers suitable for use with the present invention include those described, for example, in U.S. Pat. No. 2,989,241 (issued June 1961), U.S. Pat. No. 5,405,090 (issued Apr. 11, 1995), U.S. Pat. No. 5,704,554 (issued Jan. 6, 1998), U.S. Pat. No. 5,765,761 (issued Jun. 16, 1998) and U.S. Pat. No. 5,222,664 (issued Jun. 29, 1993). Electrostatic sprayers are also readily available from a variety of commercial sources, such as Spectrum (Houston, Tex.).

A. Resins

Resins suitable for use for the incremental coating of the particulate substrates are generally any resins which are capable of being coated on the substrate and then being cured to a higher degree of polymerization. Examples of such resins include, but are not limited to, conventional resole resins, such as phenol-aldehyde resins; unconventional resoles, such as cresol-resorcinol resins; urea-aldehyde resins; melamine-aldehyde resins; epoxy resins, such as BisPhenol A polymerized with epichlorohydrin; epoxy novolak resins; cycloaliphatic epoxy resins; furfurylalcohol resins; hybrids of novolak resins and resole resins; high ortho novolak resins; novolak resins with substituted phenolic monomers; novolak resins plasticized with glycerine and polyvinyl butyral; polyurethanes; urethane elastomers; poly(methyl methacrylate); thermosetting acrylics and thermosetting self-crosslinking acrylics; Bisphenol A poly carbonate resins; poly benzophenones; siloxanes, such as methyl siloxanes; siloxanes modified with phenolic novolaks; poly(methacrylamidoethylethyleneurea); thermosetting latexes; melamine-urea formaldehyde polymer resins; glycolureil-formaldehyde resins; benzoguanamine-formaldehyde resins; poly-glycidyl-methacrylate (Poly GMA) resins; epoxy amine adducts grafted with Phenolic novolak; water reducible acrylic/epoxy graft resins; epoxy/phosphate ester graft resins; and grafts of any such resins.

1. Resole Resins

Phenol-aldehyde resole resins having a phenol:aldehyde molar ratio from about 1:1 to about 1:3, typically from about 1:1 to about 1:1.95 can be used with the present invention. A preferred mode of preparing the resole resin is to combine phenol with a source of aldehyde such as formaldehyde, acetaldehyde, furfural, benzaldehyde or paraformaldehyde under alkaline catalysis. During such reaction, the aldehyde is present in molar excess. It is preferred that the resole resin have a molar ratio of phenol to formaldehyde from about 1:1.1 to 1:1.6. The resoles may be conventional resoles or modified resoles. Modified resoles suitable for use within the present invention are disclosed by U.S. Pat. No. 5,218,038. Such modified resoles are prepared by reacting aldehyde with a blend of unsubstituted phenol and at least one phenolic material selected from the group consisting of arylphenol, alkylphenol, alkoxyphenol, and aryloxyphenol.

Modified resole resins also include alkoxy modified resole resins. Of the numerous alkoxy modified resole resins, methoxy and benzylic modified resole resins are preferred. However, the phenolic resole resin which is most preferred is GP 761 D31, available from Georgia-Pacific Resins, Inc. (Atlanta, Ga.).

Metal ion catalysts useful in production of the modified phenolic resole resins include salts of the divalent ions of Mn, Zn, Cd, Mg, Co, Ni, Fe, Pb, Ca and Ba. Tetra alkoxy titanium compounds of the formula $Ti(OR)_4$, where R is an alkyl group containing from 3 to 8 carbon atoms, are also useful catalysts for this reaction. A preferred catalyst is zinc acetate. These catalysts produce phenolic resole resins wherein the preponderance of the bridges joining the phenolic nuclei are orthobenzylic ether bridges of the general formula $—CH_2(OCH_2)_n—$ where n is a small positive integer.

2. Novolac/Phenol-Aldehyde Resins

An embodiment of the present invention employs resin which includes phenol-aldehyde novolac polymer. The novolac may be any novolac employed with proppants. The novolac may be obtained by the reaction of a phenolic compound and an aldehyde in a strongly acidic pH region. Suitable acid catalysts include the strong mineral acids such as sulfuric acid, phosphoric acid and hydrochloric acid as well as organic acid catalysts such as oxalic acid, or para-toluenesulfonic acid. An alternative way to make novolacs is to react a phenol and an aldehyde in the presence of divalent inorganic salts such as zinc acetate, zinc borate, maganese salts, cobalt salts, etc. The selection of catalyst may be important for directing the production of novolacs which have various ratios of ortho or para substitution by aldehyde on the phenolic ring, e.g., zinc acetate favors ortho substitution. Novolacs enriched in ortho substitution, i.e., high-ortho novolacs, may be preferred because of greater reactivity in further cross-linking for polymer development. High ortho novolacs are discussed by Knop and Pilato, *Phenolic Resins*, p. 50-51 (1985) (Springer-Verlag). High-ortho novolacs are defined as novolacs wherein at least 60% of the total of the resin ortho substitution and para substitution is ortho substitution, preferably at least about 70% of this total substitution is ortho substitution.

The novolac polymer typically comprises phenol and aldehyde in a molar ratio from about 1:0.85 to about 1:0.4. Any suitable aldehyde may be used for this purpose. The aldehyde may be formalin, paraformaldehyde, formaldehyde, acetaldehyde, furfural, benzaldehyde or other aldehyde sources. Formaldehyde itself is preferred.

The novolacs used in this invention are generally solids such as in the form of a flake, powder, etc. The molecular weight of the novolac will vary from about 500 to 10,000, preferably 1,000 to 5,000 depending on their intended use. The molecular weight of the novolacs in this description of the present invention are on a weight average molecular weight basis. High-ortho novolac resins are especially preferred.

The resin composition typically comprises at least 10 weight percent novolac polymer, preferably at least about 20 weight percent novolac polymer, most preferably about 50 to about 70 weight percent novolac polymer. The remainder of the resin composition could include crosslinking agents, modifiers or other appropriate ingredients.

The preferred resins for use with the present invention are the high-ortho novolak resins. These resins include true thermosetting phenolic resins of the resole type and phenolic/phenol-aldehyde novolac resins which may be rendered heat reactive by the addition of a catalyst and formaldehyde. Such resins, having softening points of between about 150° F. and about 300° F., and more preferably between about 180° F. and 295° F. are preferred.

Regardless of which type of resin is employed a coupling agent as subsequently described is preferably incorporated into the resin during its manufacture. The coupling agent, which has a functional group reactive in the phenol-formaldehyde system of the resin is added in an amount ranging from about 0.05 to about 1.0 percent by weight of the resin. The preferred range is from about 0.1 to about 0.5 percent by weight of the resin. The coupling agent is incorporated into the resin under the normal reaction conditions used for the formation of phenol-formaldehyde resins. The coupling agent is added to the resin reactants prior to the beginning of the phenol-formaldehyde reaction. This incorporation of the coupling agent in the resin is partly responsible for the increased resin-particle bond strength provided by the invention. Optionally, and equally as acceptable, the coupling agents can be added directly onto the particulate substrate.

The preferred resin to be used with the method of the present invention is a phenolic novolac resin. When such a resin is used it is necessary to add to the mixture a cross-linking agent to effect the subsequent curing of the resin. Hexamethylenetetramine (HMTA) is the preferred material for this function as it serves as both a catalyst and a source of formaldehyde.

Additives and process steps to minimize storage and handling problems have been described by Graham and Sinclair in U.S. Pat. No. 4,732,920, which is incorporated herein by reference. This patent describes the addition of compounds such as calcium stearate to prevent sintering of the product and mineral oil to prevent dust problems, as well as a variety of other additives such as polyvinyl acetal to increase resin strength and thereby reduce the brittleness of the resin.

Coupling agents can also be employed in the process of the present invention, and necessarily is chosen based on the resin to be used. For phenolic resins, the preferred coupling agents are organo-functional silanes such as aminoalkyl silanes. The silane gamma-aminopropyl triethoxysilane is preferred for use in the present invention. Other suitable coupling agents include transition metal coupling agents known in the art, such as alkoxy zirconates and alkoxy titanates, and mixtures thereof.

Optionally, a reinforcing agent can be added to the partial microlayer boundary region of the present invention in order to increase the strength of the incrementally coated particles even further. The reinforcing agents can be added at any time during the incremental coating process, but are preferably added near the end of the process or more preferably as the last agent to be incrementally coated onto the particle. Suitable reinforcing agents for use with the present invention include the materials known to act as reinforcing agents in typical engineering resins and composite materials. Typically, such reinforcing agents have a particle size calculated to give the desired properties. For example, various mineral fillers including fumed silica, silica flour, talc, clays, mica, asbestos, calcium carbonate, calcium sulfate, metals and wollastanite are suitable for use within the present invention. The size of such reinforcing agents is typically less than 300 mesh. Reinforcing materials of a fibrous or rod like nature should be less than about 0.006" and preferably about 0.002" in length.

Additionally, fibers of either mineral or organic origin, or both, can be added and encapsulated into an outer coating or series of incremental, partial microlayer coatings in order to produce an encapsulated product having interleafed microlayers.

B. Nanoparticle System

A class of preferred reinforcing agents suitable for use with the present invention are nanoparticles. Owing to their small size, growing availability, and desirable physical and chemical characteristics, these compounds have proven to be readily adaptable to the current process for producing particles having numerous interleafed microlayers incrementally applied.

The nanoparticles suitable for use with the present invention comprise both photoactive and non-photoactive nanoparticles. The nanoparticles useful herein can be distinguished from colloids (small particles suspended in solution) in that the nanoparticles are capable of forming a coating or microlayer after the composition is applied to a surface, whereas colloids are typically only thought of as being dispersed in another media.

The nanoparticles can comprise materials, compositions, procedures, methods, conditions, and the like of serving a common purpose of modification of surfaces to bring about, if desired, the use benefits of one or more of the following: improved smoothness, modification of surface friction, improved strength, and radioactive well-logging.

Nanoparticles, as defined previously herein, are particles with diameters of about 400 nm or less. Nanoparticles suitable for use with the present invention include those with particle sizes ranging from about 1 nm to about 400 nm. Particle size distributions of the nanoparticles may fall anywhere within the range from about 1 nm, or less, to less than about 400 nm, alternatively from about 1 nm to less than about 100 nm, and alternatively from about 1 nm to less than about 50 nm. For example, a layered synthetic silicate can have a mean particle size of about 25 nanometers while its particle size distribution can generally vary between about 10 nm to about 40 nm. Alternatively, nanoparticles can also include crystalline or amorphous particles with a particle size from about 1, or less, to about 100 nanometers, alternatively from about 1 to about 50 nanometers. Nanotubes can also be used with the present invention, and include structures up to 1 centimeter long, alternatively with a particle size from about 1, or less, to about 50 nanometers.

While it is envisioned that both organic and inorganic nanoparticles can be used with the process and resultant products of the present disclosure, inorganic nanoparticles are preferable. Inorganic nanoparticles generally exist as oxides, silicates, carbonates and hydroxides. Some layered clay minerals and inorganic metal oxides can be examples of nanoparticles. Layered clay mineral nanoparticles suitable for use with the present invention are smectites, kaolins, illites, chlorites, attapulgites and mixed layer clays. Smectites, for example, include but are not limited to montmorillonite, bentonite, pyrophyllite, hectorite, saponite, sauconite, nontronite, talc, beidellite, volchonskoite and vermiculite. Kaolins include but are not limited to kaolinite, dickite, nacrite, antigorite, anauxite, halloysite, indellite and chrysotile. Illites include include but are not limited to bravaisite, muscovite, paragonite, phlogopite and biotite. Chlorites include but are not limited to corrensite, penninite, donbassite, sudoite, pennine and clinochlore. Attapulgites include sepiolite and polygorskyte. Mixed layer clays include but are not limited to allevardite and vermiculitebiotite. Variants and isomorphic substitutions of these layered clay minerals offer unique applications, and are envisioned to be included within the present invention.

The layered clay minerals suitable for use as nanoparticles within the scope of the present invention can be either naturally occurring or synthetic. Some embodiments of the present invention may use natural or synthetic hectorites, montmorillonites, bentonites, talcs such as the nanoparticulate talc (10-400 nm) available from Reade Advanced Materials, and vermiculites. Other embodiments may use the hectorite clays that are commercially available, such as the commercial hectorites Laponite™ available from Southern Clay Products, Inc., (Gonzales, Tex., U.S.A) and Rockwood Specialties, Inc. (Princeton, N.J., U.S.A.); Veegum Pro, Veegum T, and Veegum F from R. T. Vanderbilt, (Norwalk, Conn., U.S.A.); and the Barasyms, Macaloids and Propaloids from Baroid Division, National Read Comp., U.S.A.

The inorganic metal oxides of the present invention may be silica- or alumina-based nanoparticles that are naturally occurring or synthetic. Aluminum can be found in many naturally occurring sources, such as kaolinite and bauxite. The naturally occurring sources of alumina are processed by the Hall process or the Bayer process to yield the desired alumina type required. Various forms of alumina are commercially available in the form of Gibbsite, Diaspore, and Boehmite from manufactures such as Fitz Chem Corporation/Condea Servo, LLC (Elmhurst, Ill., U.S.A.).

Natural Clays

Natural clay minerals typically exist as layered silicate minerals and less frequently as amorphous minerals, and as such are suitable for use as nanoparticles as reinforcing agents within the scope of the present invention. A layered silicate mineral has $SiO_4$ tetrahedral sheets arranged into a two-dimensional network structure. A 2:1 type layered silicate mineral has a laminated structure of several to several tens of silicate sheets having a three-layered structure in which a magnesium octahedral sheet or an aluminum octahedral sheet is sandwiched between two sheets of silica tetrahedral sheets.

A sheet of an expandable layer silicate has a negative electric charge, and the electric charge is neutralized by the existence of alkali metal cations and/or alkaline earth metal cations. Smectite or expandable mica can be dispersed in water to form a sol with thixotropic properties. Further, a complex variant of the smectite type clay can be formed by the reaction with various cationic organic or inorganic compounds. As an example of such an organic complex, an organophilic clay in which a dimethyldioctadecyl ammonium ion (a quaternary ammonium ion) is introduced by cation exchange and has been industrially produced and used as a gellant of a coating.

Synthetic Clays

With appropriate process control, the processes for the production of synthetic nanoscale powders (i.e. synthetic clays) does indeed yield primary particles, which are nanoscale. However, the particles are not usually present in the form of discrete particles, but instead predominantly assume the form of agglomerates due to consolidation of the primary particles. Such agglomerates may reach diameters of several thousand nanometers, such that the desired characteristics associated with the nanoscale nature of the particles cannot be achieved. The particles may be deagglomerated, for example, by grinding as described in EP-A 637,616 or by dispersion in a suitable carrier medium, such as water or water/alcohol and mixtures thereof. Following such deagglomeration, the resultant synthetic clay nanoparticles are suitable for use with the present invention.

The production of nanoscale powders such as layered hydrous silicate, layered hydrous aluminum silicate, fluorosilicate, mica-montmorillonite, hydrotalcite, lithium magnesium silicate and lithium magnesium fluorosilicate are common. An example of a substituted variant of lithium magnesium silicate is where the hydroxyl group is partially substituted with fluorine. Lithium and magnesium may also be partially substituted by aluminum. In fact, the lithium magnesium silicate may be isomorphically substituted by any member selected from the group consisting of magnesium, aluminum, lithium, iron, chromium, zinc and mixtures thereof.

Synthetic hectorite was first synthesized in the early 1960's and is now commercially marketed under the trade name Laponite™ by Southern Clay Products, Inc. There are many grades or variants and isomorphous substitutions of Laponite™ marketed, all of which are suitable in nanoparticle form for use with the present invention. Examples of commercial hectorites include Lucentite SWN™, Laponite S™, Laponite XLS™, Laponite RD™ and Laponite RDS™.

Synthetic hectorites, such as LAPONITE RD™, do not contain any fluorine. An isomorphous substitution of the hydroxyl group with fluorine will produce synthetic clays referred to as sodium magnesium lithium fluorosilicates, which are also suitable for use with the present invention. These sodium magnesium lithium fluorosilicates, marketed as LAPONITE™ and LAPONITE S™, may contain fluoride ions of up to approximately 10% by weight. It should be understood that the fluoride ion content useful in the compositions described herein can comprise any whole or decimal numeric percentage between 0 and about 50 or more. LAPONITE B™, a sodium magnesium lithium fluorosilicate, has a flat, circular plate-like shape, and may have a diameter with a mean particle size, depending on fluoride ion content, that is any number (or narrower set of numbers) that is within the range of between about 25-100 nanometers, and as such is suitable for use as a nanoparticulate reinforcing agent with the present invention. For example, in one non-limiting embodiment, LAPONITE B™ may be between about 25-40 nanometers in diameter and about 1 nanometer in thickness. Another variant, called LAPONITE S™, contains about 6% of tetrasodium pyrophosphate as an additive. In some instances, LAPONITE B™ by itself is believed, without wishing to be bound to any particular theory, to be capable of providing a more uniform microlayer interleafed coating (that is, more continuous, i.e., less openings in the way the coating forms after drying), and can provide a more substantive (or durable) microlayer coating than some of the other grades of LAPONITE™ by themselves (such as LAPONITE RD™). The coating preferably forms at least one partial microlayer of nanoparticles on a portion of the surface of the substrate particle which has been partially and incrementally coated, and is substantially uniform in thickness but does not surround the entire particle. Rather, as discussed above, the nanoparticles form a reinforced microlayer that is interleafed with the other microlayers of resins and/or polymers previously or simultaneously applied in an incremental manner.

Impact Modifiers

Another type of reinforcing agent with utility in the present invention includes impact modifiers used in engineering resins and composite materials. Examples of such impact modifiers suitable for use with the present invention include polyisobutylene, ethylene-vinyl acetate copolymers, ethylene-propylene copolymers and other rubbery materials. Also suitable are the so-called "core shell" impact modifiers having a rubbery core with a graft polymerized crystalline shell. To obtain the proper particle size, cryogenic grinding of the rubbery materials is useful.

Suitable Carrier Medium

When the microlayer incremental coating process is carried out using deposition method such as a spray or "sputtering" technique to apply the microcoatings to a portion of the substrate, as in the methods described in the examples section, a carrier medium may be necessary in order to effect this process. The carrier medium can form part of the coating composition, or it can comprise the medium in which the coating mixture, reinforcing agent (e.g., nanoparticles) or other microlayer additives are carried (or transported) for application to the hard surface of the substrate particle.

Several non-limiting examples of types of carrier mediums are provided by way of explanation, and not by way of limitation. In one example, the coating composition can be provided in the form of an aqueous liquid in a container, and the liquid can be sprayed onto a hard surface. In such a case, the aqueous liquid carrier in the container holding the coating composition may be referred to herein as the "static carrier". When this coating composition is sprayed onto the hard surface, the liquid droplets in the spray may be referred to herein as the "dynamic carrier" (the medium that transports the nanoparticles to the surface in order to contact the surface). In another example, the coating composition may exist in a gel form in a container (the gel would be the form of the static carrier) and the gel could be diluted with water and sprayed as a liquid onto the hard surface (in which case the liquid spray would be the dynamic carrier). The term "carrier", as used herein, includes both static and dynamic carriers.

Suitable carrier mediums include liquids, solids and gases. One suitable carrier medium is water, which can be softened (Ca and Mg ions removed), distilled, deionized, or tap water. Water is valuable due to its low cost, availability, safety, and compatibility. In certain embodiments in which the carrier medium is aqueous, it may be preferred that at least some of the aqueous carrier is purified beyond the treatment it received to convert it to tap water (that is, the tap water is post-treated, e.g., deionized, distilled, or softened). The purified water could comprise: all or part of the static carrier for the composition; all or part of the dynamic carrier; or, all or part of both. Though aqueous carrier mediums are more common than dry, nonaqueous mediums, the present invention can exist as a dry powder, granule or tablet or encapsulated complex form.

Optionally, in addition to water, the carrier can contain a low molecular weight organic solvent that is highly soluble in water, e.g., ethanol, methanol, propanol, isopropanol and the like, and mixtures thereof. Low molecular weight alcohols can allow the treated hard surface to dry faster. The optional water soluble low molecular weight solvent can be used at a level of up to about 50%, typically from about 0.1% to about 25%, alternatively from about 2% to about 15%, alternatively from about 5% to about 10%, by weight of the suitable carrier medium. Factors that need to be considered when a high level of solvent is combined with the suitable carrier medium are odor, flammability, dispersancy of the compound or nanoparticle, and environment impact.

In one non-limiting embodiment, the carrier can comprise any known clearcoat composition. U.S. Pat. No. 5,853,809 describes one non-limiting example of a clearcoat composition suitable for use with the present invention.

In other acceptable embodiments, the carrier can be an airstream. For instance, the material, or the composition can be added into a stream of moving air, and the air can convey the nanoparticles to the surface to be treated.

In other embodiments, the coating material or composition can simply be dropped through the air by gravity onto the surface to be treated (one example of which would be by sifting a solid material onto the surface).

Figure 3:
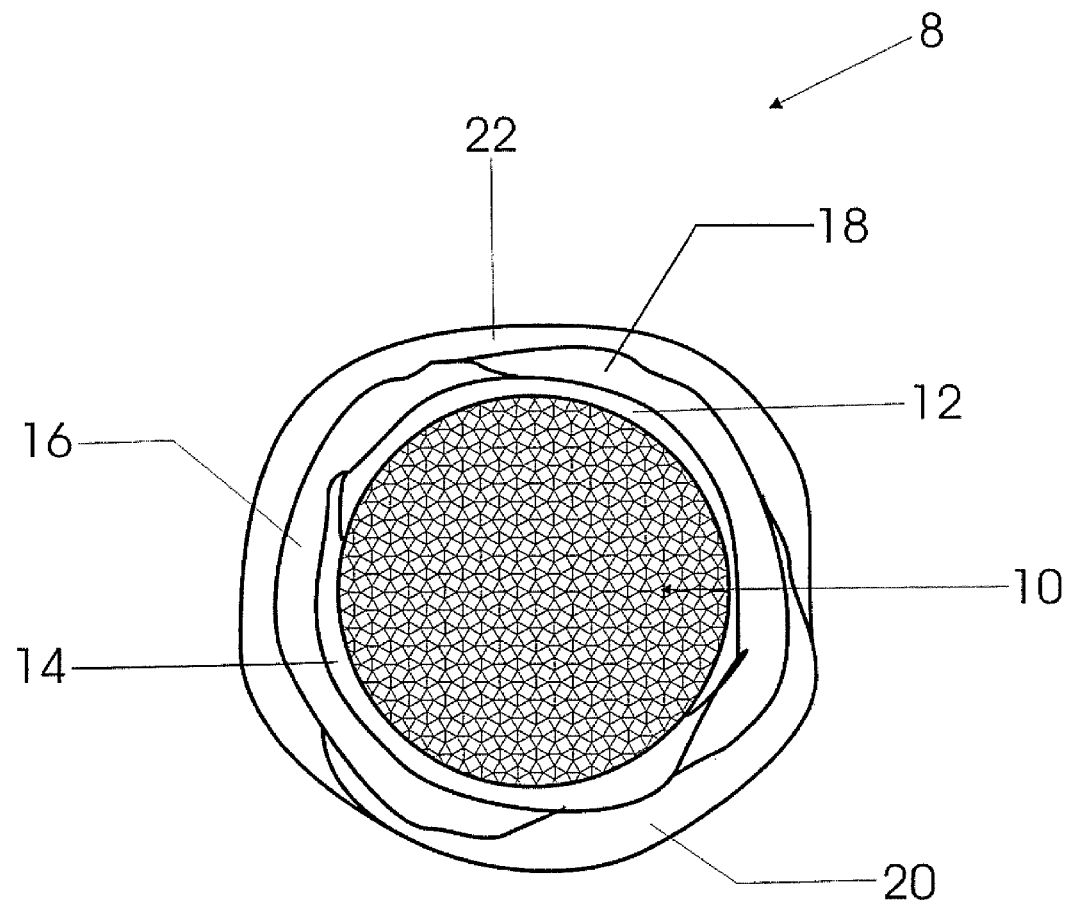
FIG. 3 is a schematic representation of an incrementally resin-coated particle according to one embodiment of the present invention, including a non-deformable particulate core surrounded by a series of interlocking, integrated coatings or layers wherein each layer of coating is interleafed with the others.

The incrementally coated proppant of the present invention, made by a process such as described above, is schematically illustrated in FIG. 3. As shown therein, and in comparison to the previously discussed prior art coatings of FIG. 1, the layers are interleafed in relation to each other due to the method of preparation (e.g. using sputtering of the coatings), thereby forming a partial microlayer effect instead of simply having an inner coat and an outer coat. For example, particulate core 10 can have as its first incremental coat 12 a primer coat, wherein the best resin for bonding of the particle and the resin coat is used, such as novolac or resol combined with silane coupling agents or transition metal coupling agents. This would be followed by a second coating 14 that may be comprised of fine mesh particles (e.g., silica flour or fumed sand) to provide an uneven surface for the minimization of movement of the particle when it is in place within the fracture. The third coat 16 can then be incrementally added, generating a resin coating to hold the fine mesh particles in coat 14 onto the resin-coated particle 10. This coat can be, for example, phenolic or epoxy resin, and the like. To this coating is incrementally added resin coat 18, which may be a resin to encapsulate a portion of the entire coated particle 8 for the purpose of creating an inertness to the fracturing fluids which are used to pump the proppants downhole. Suitable resin coatings for this coat could be phenolic or epoxy resins, as well as any of the previously mentioned resins. Finally, final coats 20 and 22 can be incrementally added in a manner as with the above-described coatings, these coatings allowing for specific purposes such as variations in wettability and triboelectric charge of the final coated particle 8. While only five coatings have been described in conjunction with FIG. 2, it will be readily appreciated that a variety of combinations and incremental coatings can be used in preparing the microlayer coated-particles of the present invention.

The free-flowing, high strength particles produced by the methods of the present invention can be used as proppants, gravel packs, fluid loss agents in hydraulic fracturing, or "Frac Packs". The particular application will determine the choice of the degree of coating (e.g., the number of interwoven coats), the composition of the coats, and whether or not the coatings are curable or not. By means of example, a curable coating can be indicated for use in gravel packing, while in a fracturing scenario a cured outer, interwoven coating may be preferred in order to prevent interaction with the fracturing fluid.

In the instance of their use in a fracture or a hydraulic fracture, a fracture is typically first generated by injecting a viscous fluid into the subterranean formation at a sufficient rate and pressure so as to cause the formation to fail in tension. The fracturing fluid can be any fracturing fluid known in the art, such as an oil based fluid, a water based fluid, an acid, an emulsion, a foam or any other fluid known in the art. The fracturing fluid can also optionally contain several additives known in the art for incorporation into fracturing fluids, such as viscosity builders, drag reducers, fluid loss additives, corrosion inhibitors, cross linkers, and the like. Injection of the fluid is typically continued until a fracture of the desired geometry is obtained. Preferably, the fracture at the well bore is at least 2.5 times the diameter of the largest proppant pellet. A carrier fluid having the proppant suspended therein is then pumped into the fracture. If the particles are resin-coated with an interleafed curable resin, the temperature of the carrier fluid during pumping operations will be low so as to prevent premature curing of the outer coatings. The carrier fluid typically bleeds off into the formation and deposits the proppant pellets into the fracture. The process is typically controlled by the addition of fluid loss agents which are small aggregate particles which temporarily slow the fluid loss to the formation.

After the interleafed coated proppant is placed, the well is shut in with pressure maintained on the formation. As the pressure within the fracture approaches the normal formation pressure, the fracture walls close in on the proppant and apply an overburden stress thereto. Deeper wells naturally exert higher closure stress and require stronger proppants with a more complex, interleafed coating. Some prior art curable resin coated proppants do not develop their full strength until the resin coating has cured in the formation, and weaker proppant particles could fail. In the event of rapid closure of the fracture, the proppant could be crushed before the resin cures, resulting in decreased permeability, fines production, and flowback problems.

When proppant pellets having an interleafed resin or polymer coating such as described in the present invention are used, it is believed that the closure stress will not adversely effect the proppant. At the same time, the temperature of the formation will heat the inner layers, allowing for both resin/polymer fusion and expansion between contiguous particles or with the walls of the subterranean formation itself. As the temperature increases, the polymerization reactions will proceed until the interleafed coatings of the particle are cured into an insoluble and infusible, multiply cross-linked state. That is, the particles are not only bound strongly to themselves due to the nature of their method of preparation and resultant interleaving of partial microlayers, but are also strongly linked to one another by resin bond, e.g. grain to grain, and adjacent particles, thereby bonding the coated particles into a permeable mass having a considerably improved compressive strength.

The incrementally coated proppant material of the present disclosure, consisting of a particulate substrate and an incrementally coated outer layer, can also be used in a variety of sand control techniques involving the placement of a filter bed in surrounding relation to or within a wellbore. This application contemplates, generally, gravel pack completions such as open-hole gravel packs, inside gravel packs, and linerless gravel packs. In each of these gravel pack completions, aggregate material is placed adjacent the formation and is sized to screen out or cause the formation sand entrained in the fluid to "bridge". The particle size of the aggregate is typically selected in relation to the size of the formation particles. The sizing can be by conventional techniques based on core analysis data, or other appropriate data. Generally, the aggregate size will range between about 6 and about 150 mesh. Additionally, this method can be used to help a "Frac Pack" which is similar to a hydraulic fracturing treatment but is a very small treatment to expand the abilities of the gravel pack to help screen out loose formation particles and clean up damage in the near wellbore area.

In carrying out gravel pack completions in conjunction with the particles of the present invention, the incrementally coated particles, suspended in a carrier fluid, are injected into the well and forced through the well casing perforations. During placement of the particles, the carrier fluid bleeds off into the formation and deposits the incrementally-coated particles into the cavity previously formed. Following placement of the particles, the well is shut-in, thereby allowing the temperature to equalize in the well. Increasing the temperature in the well around the packed particles softens or melts the outermost layers of the coated particles, and then cures the resin coat to an infusible, cross-linked state. The permeable network resulting from this treatment provides a self-sustaining, consolidated interval which prevents the aggregate from flowing through the perforations and entering the wellbore.

In making and using the interleafed resin coated particles of the present invention as radioactive tracing or logging elements, the procedure described above for the manufacture of interleafed resin coated particles is followed with the additional step of adding nanoparticulate elemental material, such as gold, silver, iridium, antimony, or any other appropriate element, in order to embed and/or interleaf the nanoparticulate element into the resin and polymer coatings on the particle. The nanoparticulate elemental material is preferably a Transition Element, wherein as used herein transition element is defined as those elements having partly filled d or f orbital shells in any of their commonly occurring oxidation states, as described in *Advanced Inorganic Chemistry, 6th Ed.* by Albert Cotton and Geoffrey Wilkinson (Wiley Interscience). Transition elements chosen for use as radioactive logging elements should ideally be capable of being converted into a radioactive isotope of the element having a known half-life. The size range of the nanoparticulate transition elements is preferably less than about 400 nm. Addition of such a transition element, or elements, could be by injection addition during one of the processes described in the Examples section below.

Following production of a incrementally resin coated particle having interleafing layers, wherein at least one of the interleating layers is a transition element capable of being converted into a radioactive isotope, the coated particle is then irradiated by any of numerous known methods in order to generate the desired radioactive activity, e.g., about 0.01 to about 100 millicuries (MC) per volume of particles.

The radioactive, resin coated particles are then transported to the work site, such as the site of a hydraulic fracture, where fluids such as fracturing fluids are being pumped downhole (down the casing of a wellbore and through the perforations into a subterranean formation). The radioactive resin coated particles are then added to the fluid or fluids in an appropriate amount at the appropriate time, and injected downhole with the fluid(s). Following completion of the operation, the subterranean formation can be logged/traced using an appropriate monitoring system, such as those described in SPE 17317 entitled "Tracer-Placement Techniques for Improved Radioactive-Tracer Logging" by A. D. Hill, et al., and SPE 5513, entitled "A Quantitative Technique for Determining Injectivity Profiles Using Radioactive Tracers", by R. Wiley and R. D. Cocanower.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Preparation of Precured Reinforced Incremental Partial Microlayer Particles (PRIMP)

Silica sand (25 lbs; 11,325 g), 20/35 mesh, was charged to a heater and heated to a temperature of between 400° F. (204° C.) and 425° F. (218° C.). The heated sand was then charged over a period of 10 seconds to a Beardsley & Piper (Aurora, Ill.) custom built Speedmullor (mill) designed for high-speed 'Hot Process' coating processes, operating at a rotor tip speed of 150 rpm. Simultaneously, 0.1% by weight of solvent-dispersed organofunctionalized silane was added by spray injector positioned in front of the primary mulling wheel of the Speedmullor in order to ensure maximal mixing.

Following the completion of sand addition to the mill, a 1.0 second pulse addition of powdered GP2202 Novolak resin was added into the mill to a total weight of 20.0 grams. Injection was via a pressurized Nordson Sure Coat system (Westlake, Ohio), utilizing a fine grade ceramic nozzle tip positioned in front of the primary mulling wheel. At 0.75 seconds into the resin addition cycle, 2.6 grams of hexamethylenetetramine (HMTA; methenamine) in solution was added via nozzle injector in a 1.0 second pulse directed generally towards the front of the primary mixing wheel. All additives phasing was controlled automatically via an Allen-Bradley Micrologix PLC automation controller system (Milwaukee, Wis.).

At 0.75 seconds into the hexamethylenetetramine pulse addition of curing agent, a pulse addition of NanoTal™ (Nanova, LLC, North Huntingdon, Pa.) reinforcing agent was added for 1.0 seconds via nozzle injector in front of the primary mixing wheel to a total weight of 0.5 grams. Following a 2.0 second pause for continued mixing of the constituents, the second addition cycle consisting of the steps of adding the powdered Novolak resin and nanoparticles was repeated. The repeat of cycles was continued for a total of 20 cycles, until approximately 3.5% of resin based on total substrate weight was added over a period of 90 seconds.

The mixture was allowed to mix for a further 30 seconds at a reduced tip speed of 100 rpm, at which point 0.10 gallons of water were added to cool the mixture prior to discharge from the mill. 5.0 seconds prior to discharge from the mill, 1.0 grams of oil were added for the control of dust. The discharged product was then screened to remove any oversize agglomeration of sand grains, and then analyzed as described below.

Example 2

Pilot Plant Manufacture of Curable Reinforced Partial Microlayer Proppant (CRIMP)

Silica sand (25 lbs; 11,325 g), 20/35 mesh, was charged to a heater and heated to a temperature of between 375° F. (191° C.) and 400° F. (204° C.). The heated sand was then charged over a period of 10 seconds to a Beardsley & Piper (Aurora, Ill.) custom built Speedmullor designed for high-speed 'Hot Process' coating processes, operating at a rotor tip speed of 150 rpm.

Following complete addition of the sand to the mill, a 2.0 second pulse addition of powdered GP2202 Novolak resin incorporated with 0.2% added organofInctional silane in a solvent was added into the mill to a total weight of 40 grams. Injection was via a pressurized Nordson Sure Coat system utilizing a fine grade ceramic nozzle tip positioned in front of the primary mulling wheel of the mill. At 1.75 seconds into the resin addition cycle, 5.2 grams of hexamethylenetetramine in solution was added via nozzle injector in a 2.0 second pulse directed generally towards the front of the primary mixing wheel. All additives phasing was controlled automatically by an Allen-Bradley Micrologix PLC automation controller system (Milwaukee, Wis.).

At a time of 1.75 seconds into the hexamethylenetetramine pulse addition of a curing agent(s), a pulse addition of 0.5 grams of silica flour reinforcing agent was added for 2.0 seconds via a nozzle injector placed in front of the primary mixing wheel. Following a 4.0 second pause for continued mixing of the constituents, the second addition cycle comprising pulse addition of Novolak resin/HMTA and silica flour reinforcing agent as described above was begun. This cycle of pulsed, "sputtered" addition of Novolak resin with an organofunctionalized silane HMTA followed by pulsed addition of silica flour reinforcing agent was repeated for a total of ten cycles until 3.5% of the resin based on total substrate weight had been added over a period of 90 seconds.

The curable reinforced partial microlayer coated proppant was allowed to mix for a further 10 seconds at a reduced mixing speed of 80 rpm, at which point 0.2 gallons of water were added for 3 seconds in order to cool the mixture before discharge from the mill. Following addition of the water, compressed air was blown into the mill in order to further reduce the temperature of the microlayer-coated proppant to a temperature below about 220° F. (104.4° C.) while simultaneously quenching the reaction and maintaining the microlayer-coated product in a curable state. Just prior (5.0 seconds) to discharge of the coated product from the mill, 1.0 gram of oil was added in order to control dust generation.

The discharged product was passed through a fluid bed cooler (Ventilex, Cincinnati, Ohio), then screened to remove any oversized agglomerations of sand grains. The final product was analyzed as described in the examples below.

Example 3

Pilot Plant Manufacture of Encapsulated Reinforced Partial Microlayer Proppant (ERIMP)

Silica sand (25 lbs; 11,325 g), 20/35 mesh, was charged to a heater and heated to a temperature of between 375° F. (191° C.) and 400° F. (204° C.). The heated sand was then charged over a period of 10 seconds to a Beardsley & Piper (Aurora, Ill.) custom built Speedmullor (mixer) designed for high-speed 'Hot Process' coating processes, operating at a rotor tip speed of 150 rpm.

Following complete addition of the sand to the mill, a 2.0 second pulse addition of powdered GP2202 Novolak resin (Georgia-Pacific Resins, Inc., Atlanta, Ga.) incorporated with 0.2% added organofunctional silane in a solvent was added into the mill to a total weight of 40 grams. Injection was via a pressurized Nordson Sure Coat system utilizing a fine grade glass-filled Teflon® nozzle tip positioned in front of the primary mulling wheel of the mill. At 1.75 seconds into the resin addition cycle, 5.2 grams of hexamethylenetetramine (HMTA; melamine) in solution was added via nozzle injector in a 2.0 second pulse directed generally towards the front of the primary mixing wheel. All additive phasing/addition was controlled automatically by an Allen-Bradley Micrologix PLC automation controller system (Milwaukee, Wis.).

At a time of 1.75 seconds into the hexamethylenetetramine pulse addition of a curing agent(s), a pulse addition of 0.5 grams of 300 mesh silica flour reinforcing agent was added for 2.0 seconds via a nozzle injector placed in front of the primary mixing wheel. Following a 4.0 second pause for continued mixing of the constituents, the second addition cycle comprising pulse addition of Novolak resin/HMTA and silica flour reinforcing agent as described above was begun. This cycle of pulsed, "sputtered" addition of Novolak resin with an organofunctionalized silane/HMTA followed by pulsed addition of silica flour reinforcing agent was repeated for a total of ten cycles until 3.5% of the resin based on total substrate weight had been added over a period of 90 seconds.

At 90 seconds, 0.25 wt. % (based on weight of the substrate) or 28 grams of epoxy resin such as DOW Chemical DER 324 or DER 331 (Dow Chemical US) was added in a 5.0 second pulse in order to generate a final, encapsulation layer. Addition was again via an injector placed in front of the primary mixing wheel. This encapsulation layer was then fully cross-linked by injection for 1.0 second (at 95 seconds cycle time) of a curing agent (DEH 20; diethylene triamine, DETA; Brenntag, N.V., Belgium) directed behind the primary mixing wheel.

The encapsulated, reinforced partial microlayer coated proppant was allowed to mix for a further 20 seconds at a reduced mixing speed of 80 rpm, at which point 0.2 gallons of water were added for 3 seconds in order to cool the mixture before discharge from the mill. Following addition of the water, compressed air was blown into the mill in order to further reduce the temperature of the microlayer-coated proppant to a temperature below about 220° F. (104.4° C.) while simultaneously quenching the reaction and maintaining the microlayer-coated product in a curable state. Just prior (5.0 seconds) to discharge of the coated product from the mill, 1.0 gram of oil was added in order to control dust generation.

The discharged product was passed through a fluid bed cooler (Ventilex, Cincinnati, Ohio), then screened to remove any oversized agglomerations of sand grains. The final product was analyzed as described in the examples below.

Example 4

Crush Resistance

Crush tests were performed according to API RP 56/60. In a typical procedure, forty-gram samples of a particular particle size of the material prepared in Example 3 were isolated and placed in a test cell. The cell was placed in a hydraulic press (Satec Systems, Inc.) and 8,000 pounds of force was applied for two minutes. The test was then repeated on a fresh sample, applying 10,000 pounds of force for two minutes. The samples were then sieved and the fines collected and weighed. The results are shown in Table 1 below, which compares the proppant of Example 3 with proppants known in the art.

TABLE 1

Crush resistance for a variety of particles, in percent.[1]

| Crush Stress Level (Klb force) | 16/20 Carbolite | 20/40 Sand | 20/40 Carbon-econoprop coated particle | 20/40 Carbolite | 40/70 Carbolite | 20/40 prior art resin (OptiProp) | 20/40 Inventive resin (ERIMP) of Ex. 3 |
|---|---|---|---|---|---|---|---|
| 7.5[2] | 14.0 | — | 5.2 | 5.2 | — | — | — |
| 8 | — | — | — | — | — | 4.43 | 1.10 |
| 10 | — | — | — | 8.3[2] | 2.0[2] | 7.48 | 1.87 |

[1]The percent of crushed material is expressed as percent weight of proppant smaller than the specified range, e.g. –40 mesh.
[2]Published literature values, for comparative value.

Example 5

Conductivity Evaluation

Conductivity tests were conducted in accordance with API RP 61. In accordance with this procedure, 20-40 mesh samples of the interleafed, microlayer coated propping agent of the present invention, such as those prepared according to Examples 1-3 above, were placed in a test cell to give a loading of 2 lbs/ft² of proppant and leveled loosely with a universal level blade device. The proppant samples were placed between Ohio Sandstone and were made a part of a cell stack. The cells were stacked to within 0.005 inch from top to bottom and positioned between the platens of a 100 ton Drake Press (FracTech Engineering) and the closure stress was increased to 300 psi. The cell was saturated with deoxygenated aqueous 2% KCl solution and then purged of air at ambient laboratory temperatures. Once saturated, the closure pressure was increased to 1000 psi, at a rate of 100 psi/min, and the temperature increased to 250° F. (121° C.) at a closure stress of 1,000 psi. Preheated nitrogen at 100 psi was passed through the sample during this period.

The system was allowed to come to equilibrium for 30 minutes, and a series of 4 conductivity measurements were taken and averaged. Tests were conducted using the propping agent of the present invention at concentrations of 2 lb/ft², at 250° F. for 50 hours at each closure. Flow rate was measured with a Mettler balance to 0.01 ml/min., and the conductivity was calculated from the darci relationship:

$$K_{wf} = \frac{26.78 \mu Q}{P}$$

wherein
$K_{wf}$=conductivity (md-ft);
26.78=factor to account for a 1½×5 inch flow area and pressure in psi;
$\mu$=viscosity of flowing fluid at temperature ($c_1$)
Q=Flow rate (ml/min)
P=pressure differential across flow path.

Figure 4:
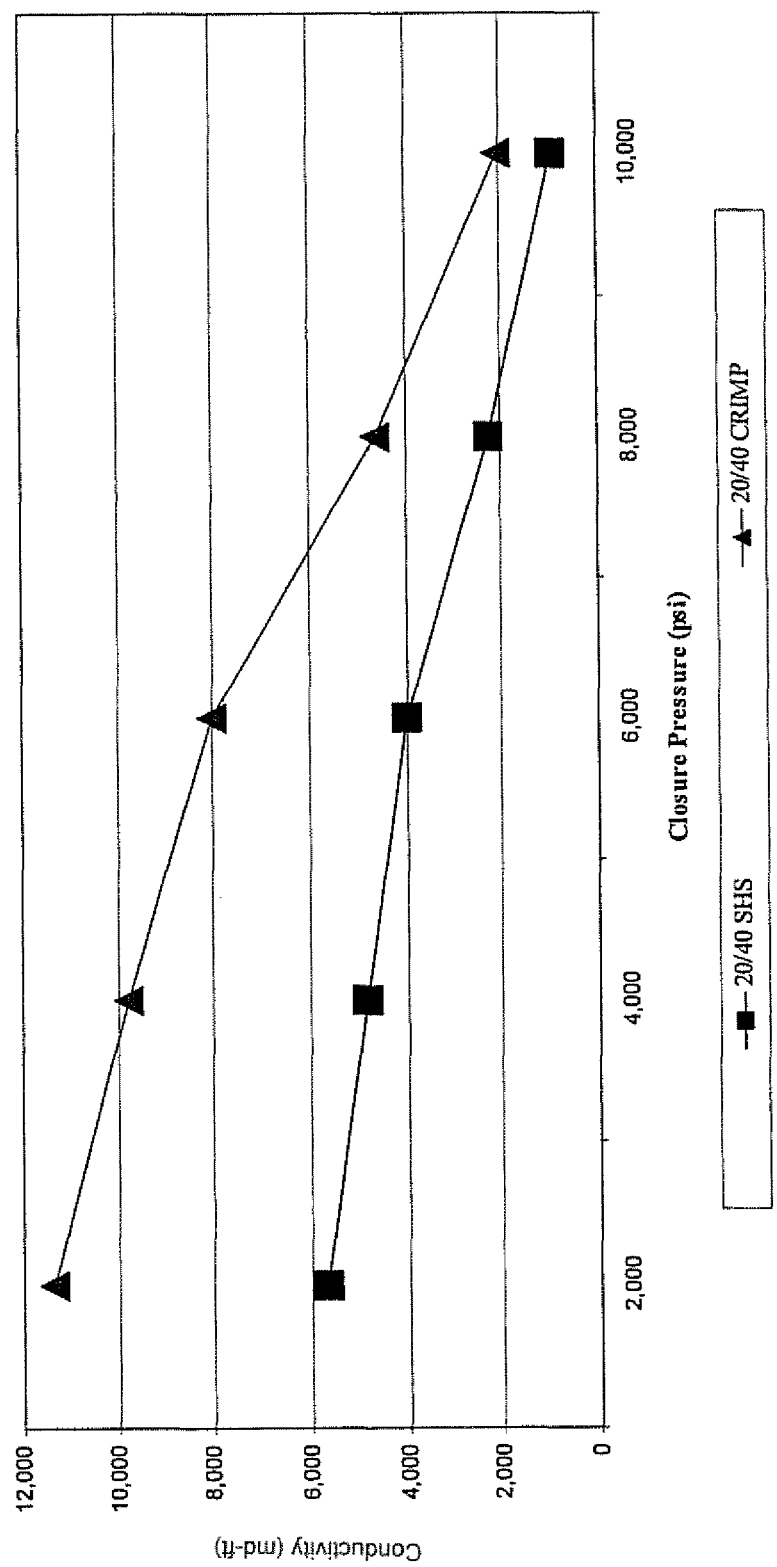
FIG. 4 is a plot of conductivity versus closure stress at a flow rate of 2 mL/min for a concentration of 2 lb/ft$^2$ of an Incremental partial Microlayer Proppant of the present disclosure and a concentration of 2 lb/ft$^2$ of control (Super HS resin coated sand) tested under laboratory conditions.
Figure 5:
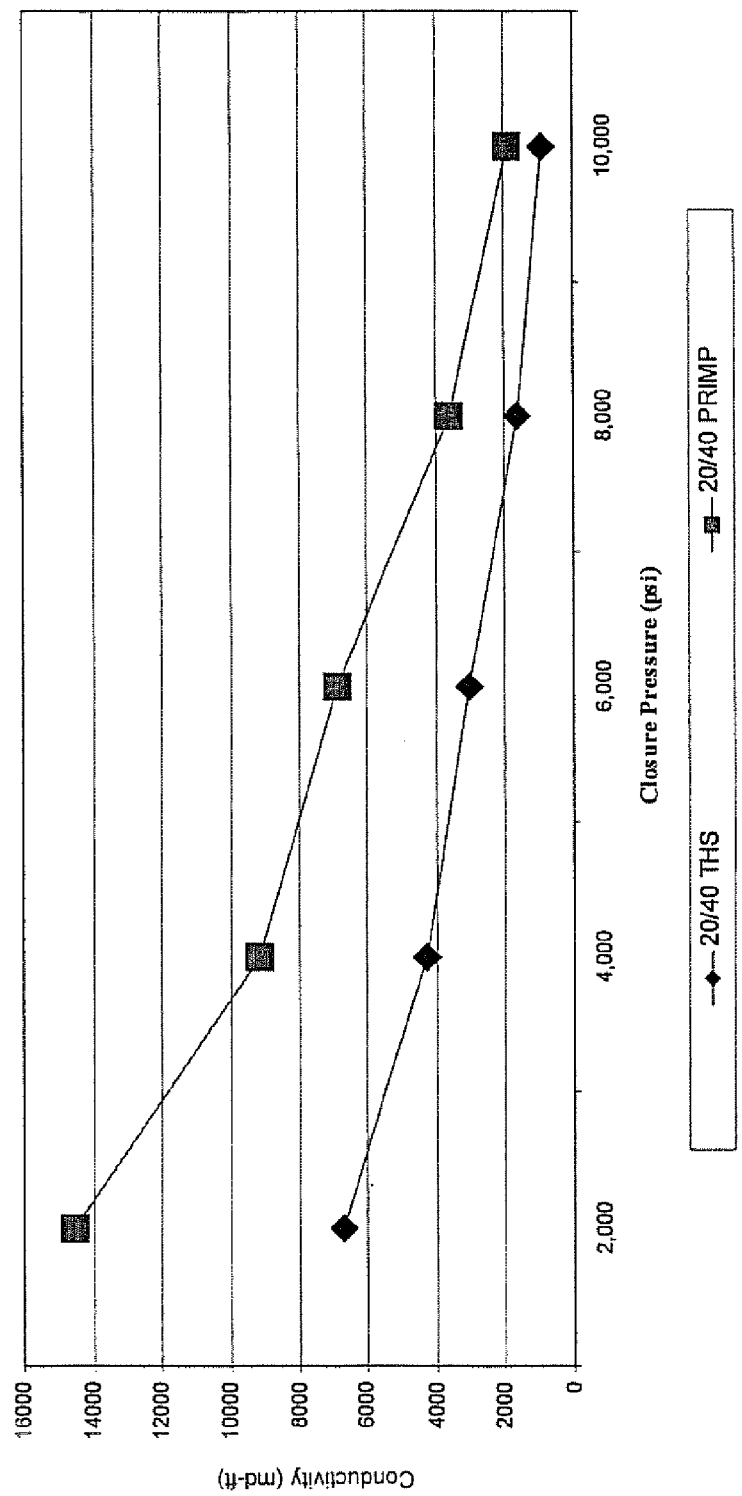
FIG. 5 is a plot of conductivity versus closure stress at a flow rate of 2 mL/min for a concentration of 2 lb/ft$^2$ of a Precured Reinforced Incremental partial Microlayer Proppant of the present disclosure and a concentration of 2 lb/ft$^2$ of control (Tempered HS resin coated sand) tested under laboratory conditions.
Figure 6:
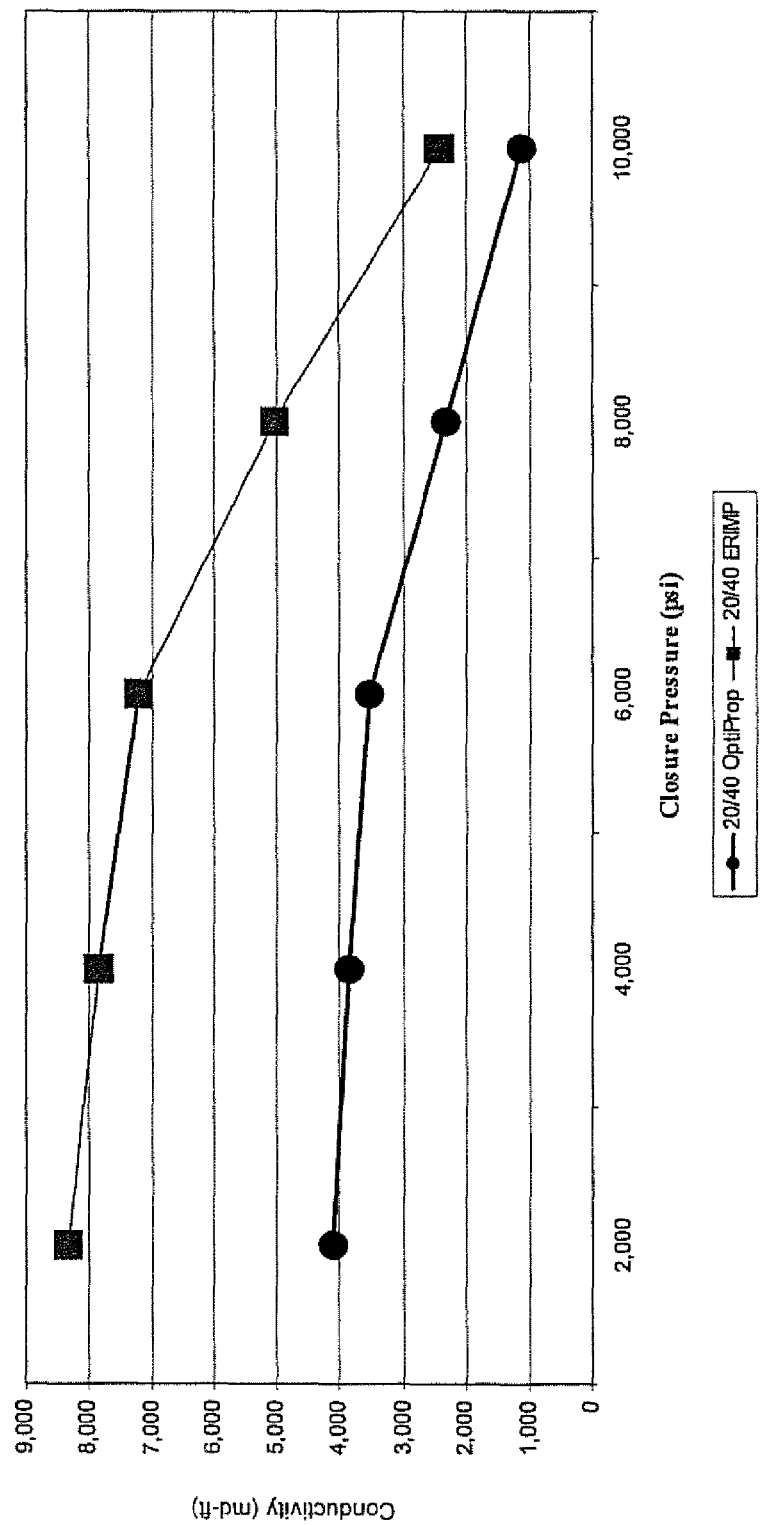
FIG. 6 is a plot of conductivity versus closure stress at a flow rate of 2 mL/min for a concentration of 2 lb/ft$^2$ of an Encapsulated Reinforced partial Microlayer Proppant of the present disclosure and a concentration of 2 lb/ft$^2$ of control (OptiProp) tested under laboratory conditions.

The controls used in comparison with the propping agents of the present invention were Super HS (SHS; Santrol, Fresno, Tex.), a multi-coat, high strength curable resin coated silica sand designed for use in higher closures, and Tempered HS (THS; Santrol, Fresno, Tex.), a reinforced high strength pre-cured or tempered resin coated silica sand for use in high closure pressure situations where flowback is not a concern. The results of these comparative conductivity tests are presented in Tables 3-5 below, and are presented graphically in FIGS. 4-6.

When proppant pellets having a fully cured, reinforced incremental partial microlayer resin or polymer coating (CRIMP) such as described in the present invention and in Example 2 are used, it is believed that the intertwined reinforced layering which results from the present production process increases the resistance to closure stress forces within the propped fracture. This can be seen graphically in FIG. 4. While not being held to one particular theory, it is believed that the multiple interfaces between the multiple partial microlayer coatings in conjunction with the presence of reinforcing agents such as nanoparticles (e.g., smectites such as talc) spread the point-of-contact load between adjacent grains, leading overall to a reduced crush.

Similarly, when a curable or encapsulated curable reinforced incremental partial microlayer particle such as PRIMP or ERIMP (see Tables 3 and 4) is used in a downhole operation, the temperature of the subterranean formation with heat the curable layers, allowing for resin/polymer fusion between the adjacent particles to occur under closure stress. As the temperature increases, the polymerization reactions will proceed until the intertwined coatings of the particle are cured into an insoluble and infusible, multiply cross-linked state within themselves. Additionally, this cross-linking will allow for strong bonds to be formed between adjacent grains. That is, the microlayer-coated particles are not only cross-linked strongly within themselves due to the nature of their preparation, and the resultant interleafing of microlayers, but are also strongly bonded between one another, e.g., grain to grain, and adjacent particles. Consequently, the coated particles bond into a highly permeable mass having a considerably improved compressive strength as well as a markedly improved conductivity.

TABLE 2

Conductivity performance results comparing 20/40 SHS with 20/40 CRIMP (Curably Reinforced Incremental partial Microlayer) Proppant.

| Closure (psi) | Control, md-ft (20/40 SHS) | 20/40 CRIMP, md-ft (Curably Reinforced Incremental partial Microlayer) |
|---|---|---|
| 2,000 | 5,660 | 5,720 |
| 4,000 | 4,820 | 4,967 |
| 6,000 | 3,990 | 4,022 |
| 8,000 | 2,275 | 2,340 |
| 10,000 | 941 | 1,121 |

TABLE 3

Conductivity performance data comparing 20/40 THS with 20/40 PRIMP (Precured Reinforced Incremental partial Microlayer) proppant.

| Closure (psi) | Control, md-ft (20/40 THS) | 20/40 PRIMP, md-ft (Precured Reinforced Incremental Partial Microlayer) |
|---|---|---|
| 2,000 | 6,700 | 7,857 |
| 4,000 | 4,276 | 4,898 |
| 6,000 | 3,023 | 3,802 |
| 8,000 | 1,650 | 1,950 |
| 10,000 | 899 | 1,026 |

TABLE 4

Conductivity performance results comparing 20/40 OptiProp with 20/40 ERIMP (Encapsulated Reinforced Incremental partial Microlayer) Proppant.

| Closure (psi) | Control, md-ft (20/40 OptiProp) | 20/40 ERIMP, md-ft (Encapsulated Reinforced Incremental partial Microlayer) |
|---|---|---|
| 2,000 | 4,109 | 4,230 |
| 4,000 | 3,856 | 3,990 |
| 6,000 | 3,520 | 3,701 |
| 8,000 | 2,319 | 2,720 |
| 10,000 | 1,099 | 1,320 |

Example 6

Permeability Evaluation

The permeability of 20/40 mesh samples of the microlayer coated proppants of the present invention (Cured Reinforced Incremental partial Microlayer, CRIMP; Precured Reinforced Incremental Partial Microlayer, PRIMP; and Encapsulated Reinforced Incremental Partial Microlayer, ERIMP; Examples 1-3, respectively) were compared to 20/40 mesh samples of Super HS multicoat curable resin (SHS; Santrol) and Tempered HS tempered resin (THS; Santrol) of the types described in Example 5 above.

Figure 7:
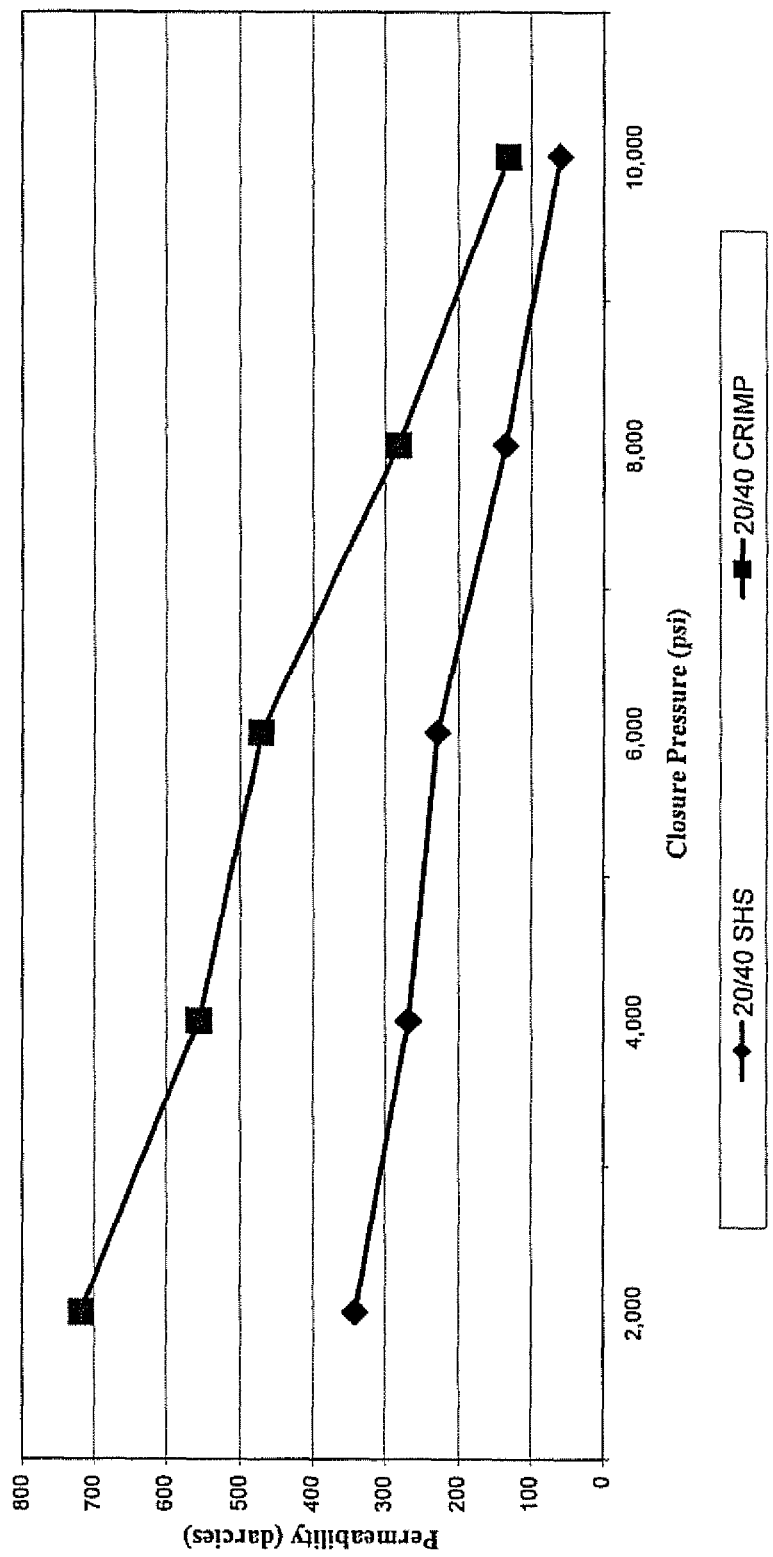
FIG. 7 is a plot of permeability versus closure stress for a sample of Super HS proppant and an Incremental partial Microlayer Proppant of the present disclosure tested under laboratory conditions.
Figure 8:
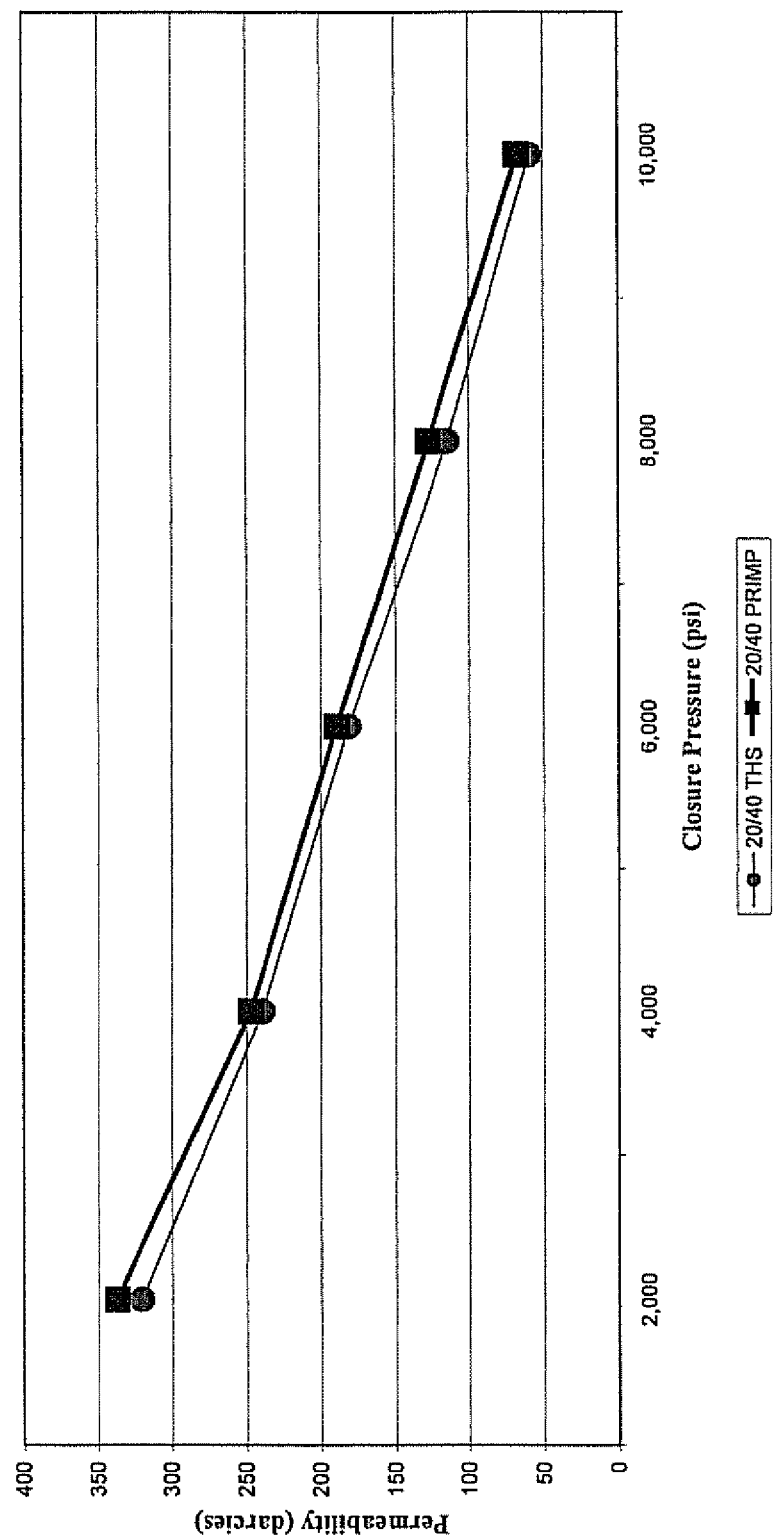
FIG. 8 is a plot of permeability versus closure stress for a sample of Tempered HS and a Precured Reinforced Incremental partial Microlayer Proppant of the present disclosure tested under laboratory conditions.
Figure 9:
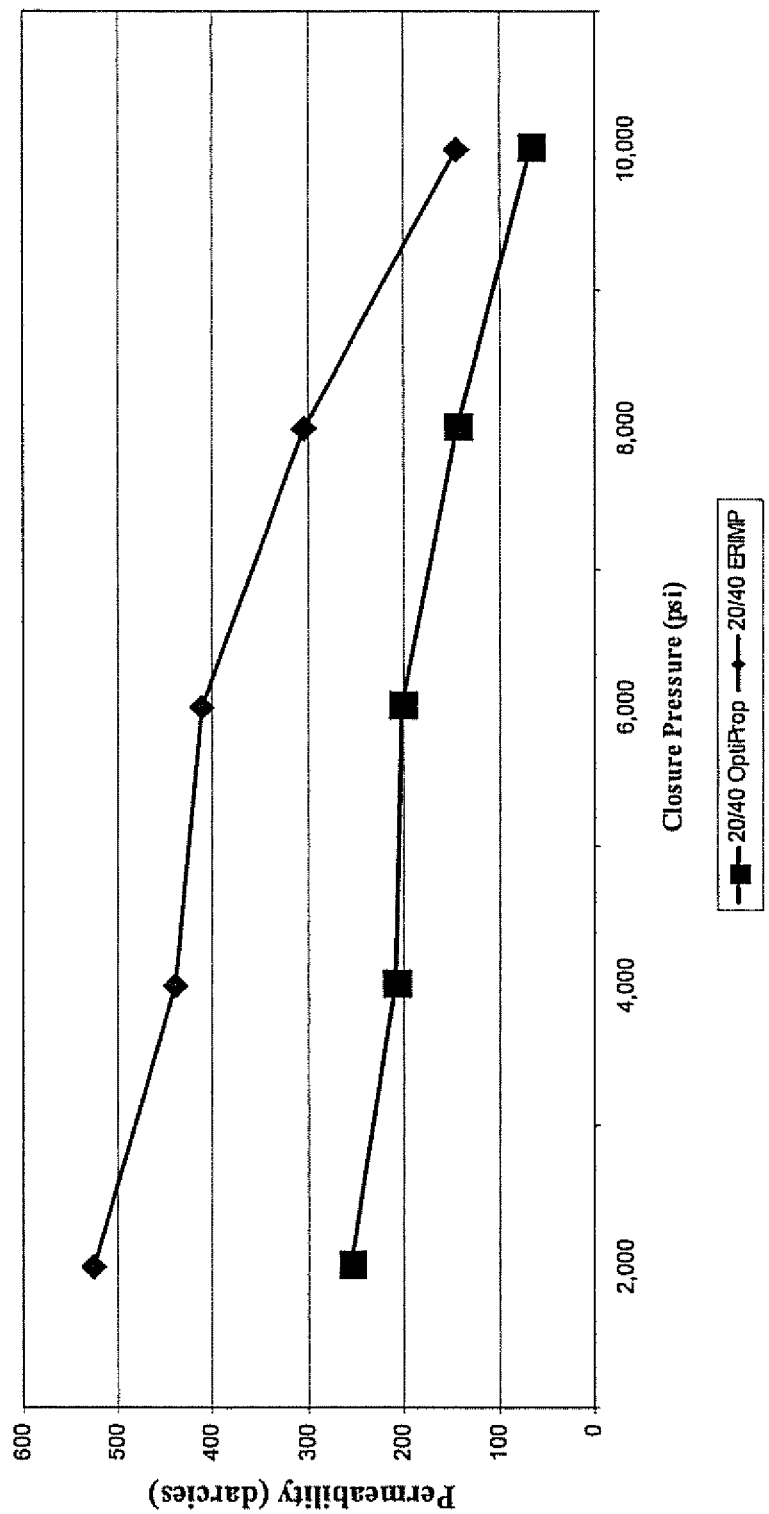
FIG. 9 is a plot of permeability versus closure stress for a sample of OptiProp and an Encapsulated Reinforced partial Microlayer Proppant of the present disclosure tested under laboratory conditions.

Permeability was determined by pumping deionized water at a known rate through a known volume (70 mL loose) of each sample placed in a permeameter designed to simulate a propped fracture. This was done at ambient temperature and at various closure stresses/pressures between 2,000 and 10,000 psi. A constant value of closure stress was maintained by a hydraulic press. The pressure drop across the simulated fracture was recorded as was the propped fracture thickness for each closure stress. The test results are presented in Tables 5-7 below, and are graphically illustrated in FIGS. 7-9.

TABLE 5

Permeability performance results comparing 20/40 SHS with 20/40 CRIMP (Curably Reinforced Incremental partial Microlayer) Proppant.

| Closure (psi) | Control, (darcies) (20/40 SHS) | 20/40 CRIMP, (darcies) (Curably Reinforced Incremental partial Microlayer) |
|---|---|---|
| 2,000 | 341 | 377 |
| 4,000 | 268 | 287 |
| 6,000 | 229 | 241 |
| 8,000 | 135 | 146 |
| 10,000 | 60 | 71 |

TABLE 6

Permeability performance data comparing 20/40 THS with 20/40 PRIMP (Precured Reinforced Incremental partial Microlayer) proppant.

| Closure (psi) | Control, (darcies) (20/40 THS) | 20/40 PRIMP, (darcies) (Precured Reinforced Incremental Partial Microlayer) |
|---|---|---|
| 2,000 | 320 | 337 |
| 4,000 | 239 | 247 |
| 6,000 | 181 | 189 |
| 8,000 | 114 | 127 |
| 10,000 | 59 | 67 |

TABLE 7

Permeability performance results comparing 20/40 OptiProp with 20/40 ERIMP (Encapsulated Reinforced Incremental partial Microlayer) Proppant.

| Closure (psi) | Control, (darcies) (20/40 OptiProp) | 20/40 ERIMP, (darcies) (Encapsulated Reinforced Incremental partial Microlayer) |
|---|---|---|
| 2,000 | 255 | 271 |
| 4,000 | 208 | 231 |
| 6,000 | 202 | 210 |
| 8,000 | 144 | 159 |
| 10,000 | 68 | 77 |

As is apparent from the figures, the permeability of the propping agent in accordance with the present invention decreases less rapidly with increasing closure stress than does the permeability of the control resin coated proppants. In fact, the propping agents of the present invention maintain a permeability of greater than 50 darcis (50,000 millidarcies) at closure pressures of up to 10,000 psi. These results indicate that the propping agents of the present invention, as well as propping agents made in accordance with the methods of the present invention, are suitable for high closure stress gas and oil well applications.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept and scope of the invention. More specifically, it will be apparent that certain agents which are both chemically and functionally related may be substituted for the agents described herein while the same or similar results would be achieved. All such similar substitutes and modifications apparent to those skilled in the art are deemed to be within the scope and concept of the invention.

What is claimed is:

1. A process for making a coated particle comprising applying a coupling agent to the surfaces of a particle heated to a temperature of between about 200° F. and 800° F.,
   sputtering a resin coat onto a portion of the surface of the particle, thereby forming an island of resin covering less than the entire surface area of the particle, and
   forming n additional islands of resin each covering less than the entire surface area of the particle by sputtering a number n of additional resin coats onto the particle in an incremental manner such that the n additional islands are interleafed with one another.

2. The process of claim 1, further comprising sputtering a reinforcing agent onto at least one resin coat.

3. The process of claim 2, wherein the reinforcing agent is nanoparticulate talc.

4. The process of claim 2, wherein the reinforcing agent is a nanoparticle selected from the group consisting of natural clays, synthetic clays, layered clays, inorganic metal oxides, impact modifiers, and mixtures thereof.

5. The process of claim 1, further comprising applying an encapsulation layer.

6. The process of claim 1, wherein the particle is selected from the group consisting of silica particles, natural particles, metal particles, ceramic particles, synthetic organic particles, and sintered bauxite.

7. The process of claim 1, wherein the resin is selected from the group consisting of novolac resins, epoxy resins, resole resins, phenol-aldehyde resins, urea-aldehyde resins, furfuryl alcohol resins, melamine resins, polyester resins, and alkyl resins.

8. The process of claim 1, wherein the coupling agent is selected from the group consisting of organo-functional silanes, alkoxy zirconates, alkoxy titanates, or mixtures thereof.

9. The process of claim 1, wherein the number n of additional resin coats is between 1 and 1000.

10. The process of claim 1, wherein the number n of additional partial coats is between 5 and 100.

11. The process of claim 1, wherein the resin coat is sputtered by vapor deposition, particle deposition, beam-induced evaporation/deposition, or thermal spraying.

12. The process of claim 1, wherein the resin coat is sputtered onto the surface by an electrostatic sprayer.

13. The process of claim 1, wherein the particle is heated to a temperature between 300° F. and 550° F.

14. The process of claim 1, wherein the particle is heated to a temperature between about 300° F. and 550° F.

* * * * *